United States Patent
Keller et al.

(10) Patent No.: US 7,138,101 B2
(45) Date of Patent: Nov. 21, 2006

(54) TWO-STAGE CATALYTIC PROCESS FOR RECOVERING SULFUR FROM AN $H_2S$-CONTAINING GAS STREAM

(75) Inventors: Alfred E. Keller, Ponca City, OK (US); Sriram Ramani, Ponca City, OK (US)

(73) Assignee: Conocophillips Company, Houston, TX (US)

( * ) Notice: Subject to any disclaimer, the term of this patent is extended or adjusted under 35 U.S.C. 154(b) by 0 days.

(21) Appl. No.: 11/034,322

(22) Filed: Jan. 12, 2005

(65) Prior Publication Data

US 2005/0180914 A1  Aug. 18, 2005

Related U.S. Application Data (60) Provisional application No. 60/536,794, filed on Jan. 15, 2004.

(51) Int. Cl.
*B01J 12/00* (2006.01)
*B01J 12/02* (2006.01)
*C01B 17/02* (2006.01)
*C01B 17/04* (2006.01)

(52) U.S. Cl. ............... 423/573.1; 423/567.1; 423/569; 423/570; 423/576.2; 423/576.8; 422/169; 422/170; 422/171; 422/172; 422/177; 422/190; 422/194; 422/211

(58) Field of Classification Search ............ 423/569, 423/570, 573.1, 576.2, 576.8, 567.1; 422/169, 422/170, 171, 172, 177, 190, 194, 211
See application file for complete search history.

(56) References Cited

U.S. PATENT DOCUMENTS

| | | | |
|---|---|---|---|
| 4,886,649 A | 12/1989 | Ismagilov et al. | |
| 5,037,629 A * | 8/1991 | Berben et al. | 423/576.8 |
| 5,242,673 A | 9/1993 | Flytzani-Stephanopoulos et al. | |
| 5,384,301 A * | 1/1995 | Flytzani-Stephanopoulos et al. | 502/304 |
| 5,603,913 A | 2/1997 | Alkhazov et al. | |
| 5,700,440 A | 12/1997 | Li et al. | |
| 5,807,410 A | 9/1998 | Borsboom et al. | |
| 5,897,850 A | 4/1999 | Borsboom et al. | |
| 6,017,507 A | 1/2000 | Nougayrede et al. | |
| 6,214,311 B1 * | 4/2001 | Kwong | 423/570 |
| 6,372,193 B1 | 4/2002 | Ledoux et al. | |
| 6,403,051 B1 * | 6/2002 | Keller | 423/573.1 |
| 6,432,375 B1 | 8/2002 | Dalla Lana et al. | |

(Continued)

OTHER PUBLICATIONS

Hass, R.H., et al., "Process Meets Sulfur Recovery Needs," *Hydrocarbon Processing* (May 1981) 104-107.

(Continued)

*Primary Examiner*—Timothy C Vanoy
(74) *Attorney, Agent, or Firm*—Conley Rose PC (57) ABSTRACT

Apparatus and process for recovering elemental sulfur from a $H_2S$-containing waste gas stream are disclosed. The apparatus preferably comprises a first reaction zone for carrying out the catalytic partial oxidation of $H_2S$, a second reaction zone for the catalytic partial reduction of any incidental $SO_2$ produced in the first reaction zone, and a cooling zone including a sulfur condenser. According to a preferred embodiment of the process, a mixture of $H_2S$ and $O_2$ contacts a catalyst in the first reaction zone very briefly (i.e, less than about 200 milliseconds) producing primarily $S^0$ and $H_2O$. Some $SO_2$ is also present in the first stage product gas mixture. A reductant gas (e.g. CO, or $CH_4$ or natural gas) is fed together with the first stage product gas mixture to a second catalytic reaction zone where the partial reduction of the $SO_2$ component to elemental sulfur and $CO_2$ is carried out.

38 Claims, 5 Drawing Sheets

U.S. PATENT DOCUMENTS

| | | | |
|---|---|---|---|
| 6,579,510 | B1 | 6/2003 | Keller et al. |
| 6,652,827 | B1* | 11/2003 | Borsboom et al. ........ 423/573.1 |
| 6,800,269 | B1* | 10/2004 | Keller et al. ............. 423/576.2 |
| 6,946,111 | B1 | 9/2005 | Keller et al. |
| 2002/0094308 | A1 | 7/2002 | Portz |
| 2002/0119091 | A1 | 8/2002 | Keller |
| 2002/0131928 | A1* | 9/2002 | Keller et al. ............. 423/576.8 |
| 2002/0134706 | A1* | 9/2002 | Keller et al. ................ 208/250 |
| 2003/0129123 | A1 | 7/2003 | Ramani et al. |

OTHER PUBLICATIONS

Hyne, J.B., "Methods for Desulfurization," *The Oil and Gas Journal* (Aug. 1972), 64-78.

Ismagilov, Z.R., et al., "New Catalyst and Processes for Environment Protection," *React. Kinet. Catal. Lett.* (1995) 55: 489-499.

Lee, H. M. and Han, J.D., "Catalytic Reduction of Sulfur Dioxide by Carbon Monoxide over Nickel and Lanthanum-Nickel Supported on Alumina," *Ind. Eng. Chem. Res.* (2002), 41:2623-2629.

Li, K.T., et al., "Catalytic Oxidation of Hydrogen Sulfide to Sulfur on Vanadium Antimonate," *Ind. Eng. Chem. Res.,* (1997), 36. 1480-1484.

PCT/US2005/000992 International Search Report dated May 23, 2005 (3 pages).

Yu, J.J. et al., "Reduction of Sulfur Dioxide by Methane to Elemental Sulfur over Supported Cobalt Catalysts," *Ind. Eng. Chem. Res.* (1997) 36:2128-2133.

Zhu, T. et al., "Redox chemistry over $CeO_2$-based catalysts: $SO_2$ reduction by CO or $CH_4$," *Catalyst Today* (1999) 50: 381-397.

* cited by examiner

TWO-STAGE CATALYTIC PROCESS FOR RECOVERING SULFUR FROM AN H₂S-CONTAINING GAS STREAM

CROSS REFERENCE TO RELATED APPLICATIONS

This application claims the benefit under 35 U.S.C. § 119(e) of U.S. Provisional Patent Application No. 60/536,794 filed Jan. 15, 2004, the disclosure of which is incorporated herein by reference.

BACKGROUND OF THE INVENTION

1. Technical Field of the Invention

The present invention generally relates to sulfur recovery processes and to apparatus for removing sulfur from $H_2S$-containing gas streams and producing elemental sulfur. More particularly, the invention relates to processes that employ an $H_2S$ catalytic partial oxidation stage followed by a $SO_2$ catalytic partial reduction stage, and to apparatus for carrying out such processes.

2. Description of the Related Art

Sulfur removal from $H_2S$-containing gas streams is a field of endeavor that is receiving a great deal of attention today, particularly in the petroleum industry. Considerable quantities of $H_2S$ are created from the refining of petroleum in processes such as crude oil hydrodesulfurization, gasification of coal and desulfurization of natural gas. Removal of $H_2S$ from $H_2S$-containing gases is a major focus of current research because utilization of the enormous supply of natural gas existing in underground reservoirs all over the world is hindered due to the presence of naturally-occurring $H_2S$ along with the methane and other light hydrocarbons that make up natural gas. Some natural gas formations contain only a relatively small concentration of $H_2S$, yet even those types of natural gas wells typically remain shut-in today because the cost of removal of the $H_2S$ using existing methods and apparatus exceeds the market value of the gas. A further deterrent to full utilization of $H_2S$-containing natural gas resources is the corrosive effect of the $H_2S$ component of liquefied natural gas on the transportation pipes and storage vessels that are needed to bring the $H_2S$-containing natural gas from remote locations to existing sulfur treatment plants.

The removal of sulfur from naturally occurring and industrially produced $H_2S$-containing gas streams is necessitated by the high demand for clean energy sources, and by increasingly stringent clean air standards for industrial emissions that restrict or prohibit the release of $H_2S$ into the environment due to its high toxicity and foul odor. Since the amount of sulfur recovered from an industrial $H_2S$-containing stream may be quite large, the elemental sulfur product can have significant commercial value.

Many processes have been described for accomplishing the removal and recovery of sulfur from $H_2S$-containing gases. The sulfur plants in common use today employ a modification of a process that was developed over 200 years ago in which $H_2S$ was reacted over a catalyst with air (oxygen) to form elemental sulfur and water (the Claus process). Sulfur recovery was low and the highly exothermic reaction was difficult to control. Modified Claus processes were introduced to overcome the deficiencies of the original Claus process, and today are generally referred to as "Claus Processes." In a conventional Claus process, the $H_2S$-containing gas stream is contacted with air or a mixture of oxygen and air in a flame. One third (⅓) of the $H_2S$ is burned according to the equation:

$$H_2S + 3/2 O_2 \rightarrow SO_2 + H_2O \tag{1}$$

The remaining ⅔ of the $H_2S$ is converted to sulfur via the (Claus) reaction:

$$2H_2S + SO_2 \leftrightharpoons 3/x\, S_x + 2H_2O \tag{2}$$

(x=2, 6, or 8 depending on temperature and pressure). The gases are cooled in a fire tube boiler after the burner. Typically, this step converts 55 to 70% of the $H_2S$ to elemental sulfur. The equilibrium of the reaction of equation (2), referred to as the "Claus reaction," limits the conversion. To improve the yield, elemental sulfur is condensed from the gas stream. After sulfur condensation and separation from the liquid sulfur, the unreacted gases are heated to the desired temperature, passed over a catalyst that promotes the Claus reaction, and cooled again to condense and separate the sulfur. Generally, two to three stages of Claus reheater, reactor, and condenser stages are employed. Over the years, most of the modifications to the Claus process have involved improvement of burner design, use of more active and durable catalysts, and use of different types of reheaters. Anywhere from 90 to 98% of the $H_2S$ fed to the unit is recovered as elemental sulfur. Any remaining $H_2S$, $SO_2$, sulfur, or other sulfur compounds in the Claus plant effluent are either incinerated to $SO_2$ and discharged to the atmosphere, or incinerated to $SO_2$ and absorbed by chemical reaction, or converted by hydrogen to $H_2S$ and recycled or absorbed by an alkanolamine solution. This is accomplished by various Claus "tail gas" treatment units, which improve the efficiency of sulfur removal from the gas discharged to the atmosphere.

Claus processes are generally efficient for processing large quantities of gases containing a high concentration (i.e., >40 vol. %) $H_2S$ in plants producing more than 100,000 tons of sulfur per year. The Claus-type processes are not suitable for use in cleaning up hydrogen or light hydrocarbon gases (such as natural gas) that contain $H_2S$, however. Not only is the hydrocarbon content lost in the initial thermal combustion step of the Claus process, but carbon, carbonyl sulfide and carbon disulfide byproducts cause catalyst fouling and dark sulfur. Moreover, carbonyl sulfide is difficult to convert to elemental sulfur. In the past, others have usually addressed the problem of purifying hydrogen sulfide contaminated hydrogen or gaseous light hydrocarbon resources by employing an initial amine extraction technique.

Typically, alkanolamine absorption of the $H_2S$ component of a gas stream is performed, followed by $H_2S$ regeneration and conventional multistage Claus sulfur recovery, usually including tail gas treatments. According to conventional industrial practices, a hydrocarbon or hydrogen containing gas stream containing a low concentration of $H_2S$ is contacted with a water solution containing an alkanolamine. Alkanolamines commonly employed in the industry are monoethanolamine (MEA), diethanolamine (DEA), methyldiethanol amine (MDEA), diglycolamine (DGA), and diisopropanolamine (DIPA). These are basic nitrogen compounds. The basic alkanolamine reacts with the $H_2S$ and other gases that form acids when dissolved in water to form alkanolamine salts, according to the following generic reaction:

Alkanolamine+Acid Gas=Protonated alkanolamine+ weak acid anion

When ethanolamine is the basic alkanolamine, the reaction is:

$$H_2N\text{—}CH_2CH_2OH + H_2S \rightarrow {}^+NH_3\text{—}CH_2CH_2OH + HS^- \quad (3)$$

The hydrogen or hydrocarbon gas, substantially freed of $H_2S$, is recovered and may be used as fuel or routed to another system for processing. After absorbing the $H_2S$ from the gas, the alkanolamine solution is transported, heated, and placed in a stripping tower. Steam generated from boiling the alkanolamine solution at the bottom of the stripping tower, lowers the vapor pressure of the acid gas above the solution, reversing the equilibrium of the acid gas/alkanolamine reaction described above. The acid gases leaving the stripper are cooled to condense most of the remaining steam. The acid gas stream then goes to a Claus sulfur recovery plant, as described above.

The major problem with the Claus process is the inherent equilibrium constraint of the Claus reaction caused by the necessity of generating the $SO_2$ intermediate. Others have addressed this problem by attempting to directly oxidize $H_2S$ to sulfur using alumina based catalysts and low temperature operating conditions. SUPERCLAUS™ processes such as the STRETFORD™ process are examples of low temperature direct oxidation methods. Typically, these processes are catalytic oxidations operating at temperatures below about 454° C., so that the reaction can be contained in ordinary carbon steel vessels. Usually these catalytic oxidation processes are limited to Claus tail gas operations or sulfur recovery from streams that have very low $H_2S$ content (i.e., about 1–3%). One reason for this limited use is that the heat evolved from the oxidation of a concentrated stream of $H_2S$ would drive the reaction temperatures well above 454° C. requiring refractory lined vessels such as the conventional Claus thermal reactor. Low concentration $H_2S$ streams will not produce enough energy release from oxidation to sustain a flame as in a thermal reactor stage. The existing catalytic oxidation technologies are thus limited to low concentration $H_2S$-containing streams using non-refractory lined vessels. Existing processes are also limited in the amount of sulfur that can be handled because the heat transfer equipment needed to remove the heat of reaction becomes extremely large due to the low temperature differential between the process and the coolant streams.

Some techniques for improving efficiency of sulfur removal that have been described in the literature for purifying hydrogen sulfide contaminated hydrogen or gaseous light hydrocarbon resources include: 1) adsorbing sulfur cooled below the freezing point on a solid material followed by releasing the trapped sulfur as a liquid by heating the solid adsorbent; 2) selectively oxidizing the remaining $H_2S$ to sulfur using air; and 3) selectively oxidizing the $H_2S$ to sulfur employing aqueous redox chemistry utilizing chelated iron salts or nitrite salts. According to the latter methods, the $H_2S$-contaminated hydrogen or hydrocarbon stream is contacted directly with the redox reagent such as chelated iron (III) ions. The iron (III) is reduced to iron (II) ion while the $H_2S$ is converted to elemental sulfur. The sulfur in liquid form is separated from the solution. These types of desulfurization units have been shown to be practical when the amount of sulfur to be removed from the stream is below 5 long tons per day. The SULFUROX™ and LO-CAT™ processes are examples of this type of $H_2S$ conversion process. Some of these direct oxidation processes use a liquid medium to carry out the oxidation or to act as a carrier for the oxidizer. These processes are also limited in the amount of sulfur recovered due to the heat removal constraints at low temperatures and the need to maintain low temperatures to keep the liquid from boiling. For at least these reasons, existing direct oxidation processes have not proved to be viable substitutes for the Claus process in most industrial applications.

U.S. Pat. No. 5,700,440; U.S. Pat. No. 5,807,410 and U.S. Pat. No. 5,897,850 describe some of the limitations of existing tail gas treatment (TGT) processes and the difficulty of meeting increasingly stringent government requirements for desulfurization efficiency in the industry. J. B. Hyne (*Oil and Gas Journal* Aug. 28, 1972: 64:78) gives an overview of available processes for effluent gas stream desulfurization and discusses economical and environmental considerations. R. H. Hass et al. (*Hydrocarbon Processing* May 1981:104–107) describe the BSR/Selectox™ process for conversion of residual sulfur in Claus tail gas or for pre-Claus treatment of a gas stream. K-T Li et al. (*Ind. Eng. Chem. Res.* 36:1480–1484 (1997)) describe the SuperClaus™ TGT system which uses vanadium antimonate catalysts to catalyze the selective oxidation of hydrogen sulfide to elemental sulfur.

U.S. Pat. No. 5,603,913 describes several oxide catalysts that have been suggested for catalyzing the reaction $$H_2S + \tfrac{1}{2}O_2 \rightarrow \tfrac{1}{2}S_2 + H_2O \quad (4)$$

Because reaction (4) is not a thermodynamically reversible reaction, direct oxidation techniques offer potentially higher levels of conversion than is typically obtainable with thermal and catalytic oxidation of $H_2S$. As mentioned above, conventional direct oxidation methods are applicable to sour gas streams containing relatively small amounts of $H_2S$ and large amounts of hydrocarbons, but are not particularly well suited for handling more concentrated acid gas streams from refineries. For this reason direct oxidation methods have been generally limited to use as tail gas treatments only, and have not found general industrial applicability for first stage sulfur removal systems from gases containing large quantities of $H_2S$.

U.S. Pat. No. 6,372,193 (Ledoux et al.) describes a process for catalytically oxidizing a gas stream containing a low concentration (up to 25 vol. %) $H_2S$ directly to sulfur over a catalytically active phase carried on a silicon carbide-based support. The catalytically active phase is an oxysulfide of Fe, Cu, Ni, Co, Cr, Mo or W.

Z. R. Ismagilov et al. (*React. Kinet. Catal. Lett.* (1995) 55:489–499) suggest that monolith catalysts containing oxides of Co, V, Fe, Cr, Mn or Al have activity for catalytically converting the $H_2S$ in natural gas to sulfur in a first oxidation stage. The reaction conditions include a spherical particulate vanadium catalyst in a fluid bed reactor operating at 250–300° C., $O_2$:$H_2S$=0.5–1.1 and $t_c$=0.5–0.8 s. Under such conditions $H_2S$ conversion and process selectivity of 99% is reported.

U.S. Pat. No. 4,886,649 (Ismagilov, et al.) describes a two stage direct oxidation process employing fluidized catalyst beds containing $MgCrO_4$ and $Al_2O_3$, or $V_2O_5$ and $Al_2O_3$. According to that method, oxygen is supplied to the first oxidation stage in an amount of 100–110% of the stoichiometric amount necessary for oxidation of $H_2S$ to elemental sulfur. The range of treatable $H_2S$ containing gases is extended to gases containing about 30–50 vol. % $H_2S$. The granular catalyst in a fluidized bed with a cooling coil or jacket, allows temperature uniformity of the catalyst bed. A maximum temperature level of 250–350° C. is desired in order to avoid forming products of coking and cracking of hydrocarbon components of the feed gas. In a second stage the unreacted $H_2S$ and oxygen from the first stage are reacted at 140–155° C. in the presence of a catalyst to form elemental sulfur.

U.S. Pat. No. 5,242,673 (Flytzani-Stephanopoulos et al.) describes a process for the direct recovery of elemental sulfur from the $SO_2$ in an off-gas stream using CO and other reducing gases and certain cerium oxide-based catalysts. Alternatively, the feed is a combustion exhaust gas stream containing $SO_2$. Certain metal oxide composite catalysts that are active for direct elemental sulfur recovery from a $SO_2$-containing gas stream by reacting the $SO_2$ with a reducing gas are described in U.S. Pat. No. 5,384,301 (Flytzani-Stephanopoulos et al.).

In a recent academic study (T. Zhu et al. *Catalysis Today* 50 (1999) 381–397) the conversion of $SO_2$ to $S^0$ by reduction over certain Cu-modified ceria-based catalysts using CO or $CH_4$ was investigated. The processes described in that study were limited to relatively low temperatures (in the range of 450–750° C.) and low $SO_2$ concentrations and do not contemplate $H_2S$ in the feed. It is stated that the use of catalysts for the direct conversion of $SO_2$ to elemental sulfur has been explored many times in the past, and various reductants have been used, including CO, $H_2$, $CH_4$ and carbon. The overall reactions between $SO_2$ and CO or $CH_4$ to elemental sulfur product are described as:

$$SO_2 + 2CO \rightarrow [S] + 2CO_2 \qquad (5)$$

$$2SO_2 + CH_4 \rightarrow CO_2 + 2H_2O + 2[S] \qquad (6)$$

where [S] represents the various elemental sulfur forms ($S_2$, $S_6$, $S_8$).

H. M. Lee and J. D. Han (*Ind. Eng. Chem. Res.* (2002) 41: 2623–2629) describe the catalytic reduction of sulfur dioxide in a combustion product gas stream using carbon monoxide to produce elemental sulfur by employing $\gamma$-$Al_2O_3$ supported sulfide catalysts of nickel and lanthanum-nickel.

Even though the Claus process still finds widespread industrial use today for recovering elemental sulfur from $H_2S$ that is generated in many industrial processes, such as petroleum refinery processes, and for reducing sulfur emissions from refineries, the Claus process is generally viewed as relatively costly for routine use on a commercial scale. As a result, the Claus process is currently performed mainly for the purpose of complying with government mandated environmental air quality standards. Most of the existing alternative desulfurization processes and systems must resort to use of a number of additional pre-treatments or post-treatment catalytic stages and tail gas-treatment units (TGTUs) in order to adequately clean the waste gas that is vented into the air sufficiently to meet current environmental regulations for venting of cleaned $H_2S$-containing gas streams. Multi-stage tail gas treating units (TGTUs) typically convert the $H_2S$ that did not react in the Claus unit to elemental sulfur by (a) oxidizing completely to $SO_2$, (b) reacting the $SO_2$ with $H_2S$ in smaller concentrations to form $S^0$, and (c) reacting very small concentrations of $H_2S$ with oxygen to form $S^0$ at low temperatures using a catalyst. A number of TGTUs are usually needed to achieve the 99+% conversion of $H_2S$ to $S^0$, and involves a large initial investment and appreciable maintenance costs.

Significant capital and maintenance costs are associated with conventional multi-stage treatment units. More economical and efficient ways of recovering elemental sulfur from an $H_2S$-containing gas stream and of removing environmentally harmful $H_2S$ from industrial vent stack exhaust gases are needed. Conventional desulfurization operations are also not practical for use at small operations such as remote well sites or on natural gas producing offshore oil platforms.

The basic SPOC™ technology, as described in co-owned U.S. patent application Ser. No. 09/625,710, U.S. Pat. No. 6,579,510, U.S. patent application Ser. No. 10/024,679 (Publication No. 2002/0134706), and U.S. patent application Ser. No. 10/024,167 (Publication No. 2002/0131928), which are hereby incorporated herein by reference, provides an alternative to the conventional Claus process to handle $H_2S$-containing fluid streams. U.S. Patent Application Publication Nos. 2002/0131928 and 2002/0134706 describe methods of selectively converting even high concentrations of hydrogen sulfide in $H_2S$-containing gas streams to elemental sulfur via a short contact time catalytic partial oxidation process (SPOC™) that are more economic and efficient than a Claus type process. The process is carried out in a more compact system compared to a conventional Claus plant. Conversion of $H_2S$ to elemental sulfur by the SPOC™ process may be accompanied by the formation of some $SO_2$ as a result of gas-phase reactions between $H_2S$, $S^0$ and $O_2$ that occur both downstream from the catalyst zone and within the catalyst zone. This secondary production of $SO_2$ is typically observed when higher than stoichiometric $O_2$/$H_2S$ ratios are used to increase the $H_2S$ conversion. An apparatus and process that further improve the conversion of $H_2S$ to elemental sulfur would be valuable in the art, particularly for meeting stringent Federal environmental standards and the demands for cleaner industrial waste gas emissions as required by the Environmental Protection Agency.

SUMMARY OF THE INVENTION

The present invention provides a process and apparatus in which $H_2S$-containing streams, with $H_2S$ concentrations ranging from very low to high (e.g., about 1% to 100% (by volume)), are converted to elemental sulfur and water, and, in preferred embodiments, achieve greater than 99% conversion of $H_2S$ to $S^0$. The basic SPOC™ process has been modified to improve the total $H_2S$ conversion and the amount of $S^0$ recovered. The improvement includes a second catalytic stage following an initial $H_2S$ catalytic partial oxidation stage, both stages preferably contained in a single reactor and still operating in a short contact time mode (i.e., millisecond range). In the first stage, $H_2S$ is converted to $S^0$ by the catalytic partial oxidation of $H_2S$ according to reaction $$H_2S + \tfrac{1}{2}O_2 \rightarrow \tfrac{1}{2}S_x + H_2O \qquad (7)$$

and in the second stage, incidentally produced $SO_2$ (generated in the first stage) is converted by catalytic partial reduction by a reductant gas (e.g., CO, $CH_4$ or $H_2$) to elemental sulfur and carbon dioxide, according to the reaction:

$$SO_2 + CO/CH_4 \rightarrow S_x + CO_2 \qquad (8)$$

or $$SO_2 + H_2 \rightarrow S_x + H_2O \qquad (9)$$

(wherein x=2, 6 or 8, depending on temperature and pressure). The total or nearly complete conversion of the $H_2S$ component to elemental sulfur is achieved, and the yield of recovered elemental sulfur is thereby enhanced. This two-stage process and system (termed SPOC-II™) offers significant advantages for more efficiently recovering elemental sulfur from $H_2S$-containing streams and for reducing pollution of the air by $H_2S$ escaping from natural gas wells or emissions from petroleum refinery vent stacks. Another advantage of the present apparatus and process is that they can be operated at superatmospheric pressure and high flow rates to make possible a relatively compact sulfur removal plant. The new apparatus and process also make it more economically and environmentally feasible for refineries to utilize high sulfur crude oils by providing for the efficient recovery of the accompanying $H_2S$ waste gas.

Employing a short contact time reactor and suitable catalysts, the process allows the direct oxidation of $H_2S$ to take place on gas streams containing a much wider range of $H_2S$ concentrations than is presently possible with conventional $H_2S$ direct oxidation processes and operating at temperatures ranging up to about 1,500° C. By optimizing $H_2S$ conversion and catalytically reducing any incidental $SO_2$ that is formed, the equilibrium constraint of the Claus reaction (Reaction 2) is removed and the conversion of $H_2S$ to sulfur in the direct oxidation step is urged forward toward completion. Achieving a high level of conversion in the initial direct oxidation stage (Reaction 4) allows the elimination of the intermediate catalytic stages of the Claus reaction. By reducing the incidental $SO_2$ to $S^0$ in a second stage, the need for $SO_2$ conversion or absorption from the tail gas is lessened or obviated, which constitutes a considerable improvement in operability and stability over conventional Claus processes. By manipulating the air or oxygen that is fed in the first stage and the reducing gas that is fed in the second stage, the conversion of $H_2S$ is optimized and the $SO_2$ level in the product gas is minimized.

In accordance with one aspect of the present invention, a sulfur recovery system is provided that comprises (a) a first reaction zone containing a catalyst having activity for catalyzing the partial oxidation of $H_2S$ to elemental sulfur and water in the presence of $O_2$, (b) a second reaction zone adapted for receiving reacted gases from the first reaction zone and containing a catalyst having activity for catalyzing the partial reduction of $SO_2$ to elemental sulfur in the presence of a reductant gas, (c) an inlet for the reductant gas disposed between the first and second reaction zones, and (d) a cooling zone comprising a sulfur condenser having a liquid sulfur outlet and a desulfurized gas outlet. In some embodiments the system also includes a gas re-heater and at least one tail gas treatment unit.

In some embodiments, the first and second reaction zones are contained in a single reactor. In other embodiments, each of the reaction zones is contained in a separate reactor. Because the exothermic partial oxidation reaction and associated oxidation reactions can reach temperatures of 1,450° C. or more, in preferred embodiments the reactor is capable of withstanding temperatures of at least about 1,450° C. In certain embodiments, the cooling zone comprises a heat exchanger with a number of thermally conductive tubes and at least one thermal insulator, such as a ceramic ferrule protects the thermally conductive tubes.

In another embodiment of the present invention, a process for recovering sulfur from a $H_2S$-containing gas stream is provided. Preferably the process is carried out in an apparatus or system described above. The process includes contacting a first feed gas stream comprising a mixture of $H_2S$ and $O_2$ with a first catalyst in a first reaction zone. The first catalyst is active for catalyzing the partial oxidation of $H_2S$ to elemental sulfur and water, and accordingly a first stage product gas mixture is formed. The process also includes maintaining the temperature of the first reaction zone at least above the dew point of sulfur, preferably more than 300° C., more preferably in the range of 500° C.–1,300° C. A second feed gas stream comprising a mixture of the first stage product gas mixture and a reductant gas is then contacted with a second catalyst in a second reaction zone. The reaction zones are preferably contained in a single reactor unit, but they may also be in the form of separate reactor units in serial flow arrangement. The second catalyst has activity for catalyzing the partial reduction of $SO_2$ to elemental sulfur in the presence of a reductant gas, whereby a second stage product gas mixture is formed comprising elemental sulfur, $H_2O$ and $CO_2$. The temperature of the second reaction zone is kept above the dew point of sulfur. The process also includes passing the second stage product gas mixture into a cooling zone and cooling the second stage product gas mixture sufficiently to form liquid sulfur and a desulfurized second stage product gas.

In preferred embodiments, the process includes regulating the oxygen feed to provide a $O_2:H_2S$ molar ratio of at least 0.6:1 in the first feed gas stream. This greater than stoichiometric amount of oxygen facilitates the complete conversion of $H_2S$ to $S^0$ and a manageable amount of $SO_2$. Preferably the process also includes regulating the reductant gas feed to provide a $C:SO_2$ molar ratio of 1:0.3 to 1:2.5 in the second stage feed gas mixture. In certain preferred embodiments of the process, the concentration of $O_2$ in the first feed gas mixture is regulated such that essentially 100% of the $H_2S$ component of the feed gas mixture is converted, the $SO_2$ content of the first stage product gas mixture is no more than about 50% (sulfur in the form of $SO_2$ relative to the original amount of sulfur in the $H_2S$ feed), and the elemental sulfur content is at least 50% (sulfur in the form of $S^0$ relative to the original amount of sulfur in the $H_2S$ feed). In certain embodiments the $SO_2$ content of the desulfurized second stage product gas is less than 5% by volume. In certain embodiments the $H_2S$ content of the desulfurized second stage product is less than 5% by volume.

In certain embodiments, the process includes cooling the second stage product gas mixture to a temperature above the dewpoint of sulfur, to provide a partially cooled product stream. The partially cooled product stream is then passed into a sulfur condenser and further cooled to the dewpoint temperature of gaseous elemental sulfur, or lower, but above the melting point of solid sulfur, such that the liquid phase of the sulfur product is favored. Liquid sulfur can be withdrawn from the sulfur condenser.

In certain embodiments of the process the temperature of the first reaction zone is in the range of about 700° C.–1,500° C., preferably in the range of 850° C.–1,450° C. In some embodiments, the process includes preheating the first stage feed gas mixture (e.g., to about 200° C.) before contacting the first catalyst. In certain embodiments of the process the temperature of the second reaction zone is in the range of about 350° C.–1,200° C.

In some embodiments, the process includes a feed gas mixture/first catalyst contact time (of each portion of the feed gas mixture that contacts the first catalyst) not exceeding 200 milliseconds. In some embodiments, the contact time is less than 50 milliseconds, less than 20 milliseconds, or even 10 milliseconds or less when the reactor is operated to recover elemental sulfur from an $H_2S$ containing gas. In some embodiments the process includes maintaining autothermal reaction promoting conditions. In some embodiments short contact time is accomplished by operating the process at a space velocity of at least about 20,000 $h^{-1}$, preferably at least 100,000 $h^{-1}$. In some embodiments the space velocity is as much as 25,000,000 $h^{-1}$–100,000,000 $h^{-1}$. In some embodiments the process is carried out at superatmospheric pressure, i.e., the first and/or second reaction zone is at superatmospheric pressure. In some embodiments, the process includes a feed gas mixture/catalyst contact time (with the second catalyst bed) not exceeding 10 seconds, more preferably less than 1 second and still more preferably less than 200 milliseconds. In certain embodiments the process comprises supplying oxygen to the first catalyst in increments.

In still other embodiments of the present invention, the sulfur recovery process employs a first catalyst comprising at least one metal chosen from the group consisting of platinum (Pt), rhodium (Rh), ruthenium (Ru), iridium (Ir), nickel (Ni), palladium (Pd), iron (Fe), cobalt (Co), rhenium (Re), rubidium (Rb), vanadium (V), bismuth (Bi) and antimony (Sb). In certain preferred embodiments the first catalyst comprises Pt, Rh or a mixture thereof, especially Pt—Rh alloys. In some embodiments the first catalyst comprises V, Bi or Sb. In some embodiments the first catalyst also includes at least one alkaline earth element (e.g., Mg, Ba or Ca), or an oxide thereof. In some embodiments the first catalyst includes one or more lanthanide element or oxide thereof (i.e., La, Ce, Pr, Nd, Pm, Sm, Eu, Gd, Tb, Dy, Ho, Er, Tm, Yb or Lu, or some combination of those elements, and oxides thereof), preferably Mg, Sm, Yb or Pr, and/or oxides thereof.

In some embodiments the first catalyst comprises a lanthanide oxide, preferably samarium oxide. In certain embodiments the first catalyst comprises rhodium and samarium oxide or magnesium oxide. In some embodiments the first catalyst comprises platinum and samarium oxide or magnesium oxide. In certain embodiments the first catalyst comprises a platinum-rhodium alloy disposed on a lanthanide oxide coated refractory support, preferably Sm oxide coated. In certain embodiments the first catalyst comprises a Pt—Rh alloy disposed on an alkaline earth oxide coated refractory support, preferably Mg oxide coated.

In other embodiments the process employs a first catalyst comprising at least one carbided metal, preferably platinum and rhodium. In certain embodiments the first or second catalyst comprises a bulk mesh or gauze structure or monolith structure. In other embodiments the first and/or second catalyst comprise(s) a plurality of divided units such as particles, granules, beads, pills, pellets, cylinders, trilobes, extrudates or spheres. In certain embodiments each divided unit is less than 25 millimeters in its longest dimension.

In some embodiments the second stage catalyst comprises a single or mixed metal oxide containing an alkaline earth or lanthanide element of the Periodic Table of the Elements (CRC HANDBOOK OF CHEMISTRY AND PHYSICS, 82nd ed., 2001–2002), and may contain a precious metal promoter (i.e., Ag, Au, Pd, Pt, Rh, Ru, Os, Ir).

In accordance with certain embodiments of the present invention, the process employs as the second catalyst a composition comprising at least one metal oxide comprising an alkaline earth metal or a lanthanide metal. The second catalyst may also include a promoter comprising one or more precious metal. In some embodiments, the metal oxide contains at least one metal chosen from the group consisting of Be, Mg, Ca, Sr, Ba, La, Ce, Pr, Nd, Pm, Sm, Eu, Gd, Tb, Dy, Ho, Er, Tm, Yb and Lu. In some embodiments, the precious metal promoter is Ag, Au, Pd, Pt, Rh, Ru, Os, or Ir, or a mixture of any of those metals. Certain embodiments of the process employ a catalyst containing 1–20 wt % metal oxide in which the metal component is one or more alkaline earth or lanthanide metal. In come embodiments, the precious metal content is 0.05–10 wt %. In still other embodiments, the process comprises maintaining the temperature of the second reaction zone above the dewpoint of sulfur, preferably in the range of about 350–1,200° C., more preferably in the range of 500–800° C. These and other embodiments, features and advantages of the present invention will become apparent with reference to the following description and drawings.

BRIEF DESCRIPTION OF THE DRAWINGS

For a more detailed description of the present invention, reference will now be made to the accompanying Figures, wherein.

DETAILED DESCRIPTION OF PREFERRED EMBODIMENTS

Figure 1:
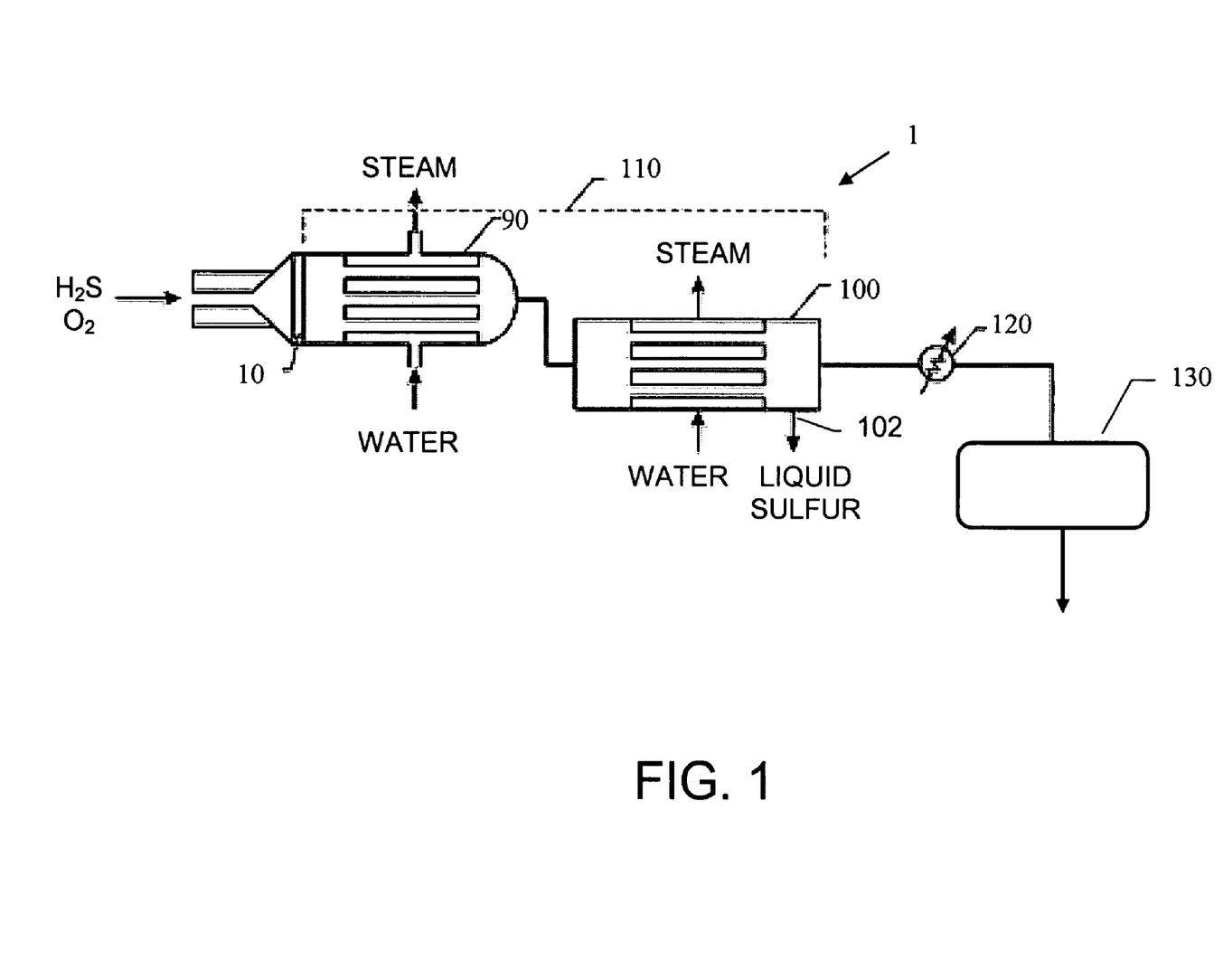
FIG. 1 is a schematic representation showing the components of a preferred embodiment of a sulfur recovery system according to the present invention.

A basic SPOC-II™ sulfur recovery system 1, shown in FIG. 1, includes reactor 10 and a cooling zone 110, which contains a heat exchanger 90 and a sulfur condenser 100. Depending on the purity of the $H_2S$ stream, the particular contaminating gases included in the feedstock, and the purity requirements for the emerging gas stream, the system may also include a heater 120 and one or more tail gas clean up unit 130. The reactor is preferably similar to the short contact time (i.e., 200 milliseconds or less)/fast quench (i.e., less than one second) reactors that are used for carrying out the catalytic partial oxidation of light hydrocarbons and hydrogen sulfide as described in U.S. Pat. No. 6,403,051 or U.S. Pat. No. 6,579,510, except in the present case reactor 10 is modified to include two different reaction zones in serial arrangement. The first reaction zone is suitable for carrying out the catalytic partial oxidization of $H_2S$ to gaseous elemental sulfur and water. The second reaction zone is suitable for carrying out the catalytic partial reduction of secondarily produced $SO_2$ that emerges from the first reaction zone.

Figure 2:
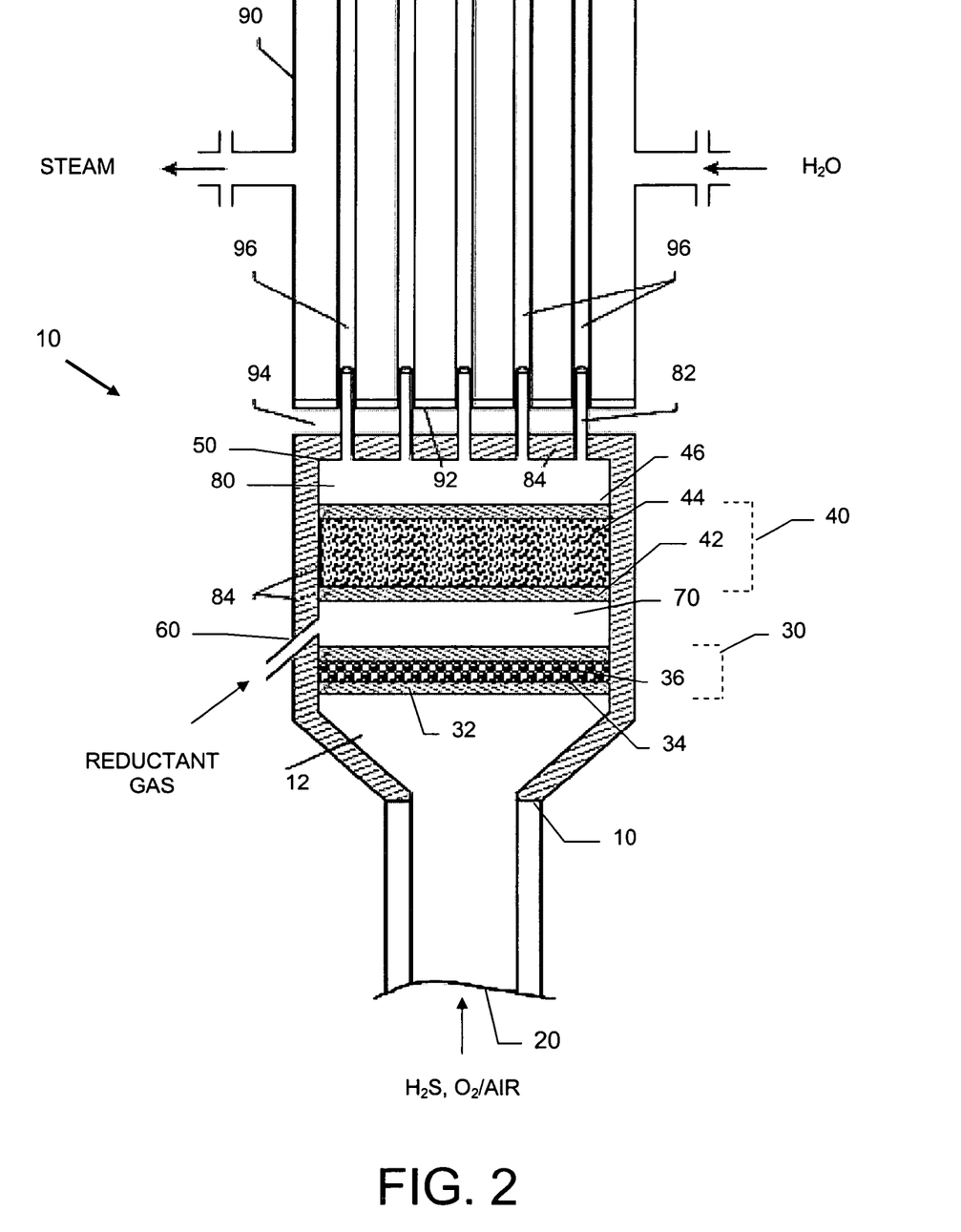
FIG. 2 is a schematic representation showing in cross-section a two-stage reactor and heat exchanger in accordance with an embodiment of the present invention.

FIG. 2 illustrates schematically an enlarged cross-sectional view of the two-stage reactor 10 of FIG. 1. Very generally described, the reactor is essentially a tube made of materials capable of withstanding the temperatures generated by the exothermic catalytic partial oxidation reaction (Reaction 7, above). Reactor 10 includes a feed gas inlet 20, a first reaction zone 30, a second reaction zone 40, a reacted gas zone 80 and at least one product gas outlet 50. First reaction zone 30 preferably includes a thermal radiation shield or barrier 32 positioned immediately upstream of a first catalyst 34 in a fixed-bed configuration. Radiation barrier 32 is preferably a porous ceramic or refractory material that is suited to withstand the reactor operating temperatures and provide sufficient thermal insulation to the feed gas mixture to prevent gas phase reactions (pre-ignition) before reaching the catalyst 34 in zone 30. Suitable refractory barrier materials (e.g., alpha alumina) are well known in the art. A second barrier 36, which may be the same as barrier 32, is preferably positioned on the downstream side of catalyst 34 to retain the catalyst bed, which may be particulate, as discussed in more detail below. In commercial scale operations the reactor is constructed of or lined with any suitable refractory material that is capable of withstanding the temperatures generated by the exothermic catalytic partial oxidation reaction. Downstream from reaction zone 30 is a second reaction zone 40 containing catalyst 44, which is preferably bounded by barriers 42 and 46, which may be like barriers 32 and 36.

Between reaction zones 30 and 40 is mixing zone 70 which is capable of receiving the first stage product gas mixture from reaction zone 30, and also has an inlet 60 for a reductant gas stream. Following reaction zone 40 is reacted gas zone 80 which includes at least one outlet 50 for the product gases from reaction zone 40. Barrier 46 is preferably capable of providing sufficient thermal insulation to the product gas mixture 48 from reaction zone 40 to permit the gases to begin cooling in reacted gas zone 80 as they move rapidly toward the reactor outlet 50.

The first catalyst 34 is positioned in reaction zone 30 in the flow path of the feed gas mixture introduced via inlet 20. Catalyst 34 can have any suitable geometry. For example, it could be in the form of one or more layers of wire gauze, a monolith, or a bed of discrete or divided structures that is held between two porous refractory disks (radiation barriers 32,36). Suitable catalyst compositions are described in more detail below in the subsection entitled "$H_2S$ Partial Oxidation Catalysts (First Stage Catalysts)." The second catalyst 44 is positioned in reaction zone 44 similarly to catalyst 34 and may have any of the above-described geometries. The catalytic component of catalyst 44 is different than that of catalyst 34, however, and is described below in the section entitled "$SO_2$ Partial Reduction Catalysts (Second Stage Catalysts)."

As shown in FIG. 2, reactor 10 includes an inlet 20 for the feed gas mixture containing $H_2S$ and $O_2$. The feed gases may be introduced as a mixture or fed separately and mixed upstream from the first reaction zone 30. A static mixer, such as a group of vanes projecting from the walls of a concentric perforated pipe, may be employed. It should be understood that the configuration of the reactor and the position of the feed injection openings could be configured in a variety of ways without affecting the principles or operation of the present system. For example, a separate $O_2$ injection opening could be positioned such that the oxygen is mixed with the $H_2S$ during the contacting of the $H_2S$-containing gas stream with the first catalyst. Such a configuration may help reduce the occurrence of unwanted side reactions that might otherwise rapidly occur during or after mixing of $O_2$ with the $H_2S$ but prior to contacting the catalytic surfaces. Also, the manner of mixing the gases could also be modified without altering principles or operation of the system.

Adjacent reactor outlet(s) 50 is a heat exchanger 90, which can be a waste heat or fire tube boiler, for cooling the second stage product gas mixture. Heat resistant ferrules 82 are embedded in refractory material 84 that lines at least the reaction zones and adjacent portions of reactor 10 that are exposed to high temperatures (e.g., 1,300° C. or more). Tube sheet 94 is a divider between the hot product gases and the boiling water where the second stage product gas mixture exits the reactor and enters heat exchanger 90, and contains a plurality of thermally conductive tubes 96 that extend from the process (reacted) gas outlet of reactor 10 through heat exchanger 90. The tube sheet 94 and tubes 96 are preferably made of carbon steel. Since the carbon steel of the tubes and tube sheet cannot stand the high temperatures of the process gas, which can reach 1,300° C. or more, temperature protection for the metal is needed. Ferrules 82 connect to tubes 96 and, together with tube sheet 94, force the product gas mixture to exit the reactor by going through the inside of tubes 96, and heat exchanger 90 includes an outlet for steam. Water that is contained by the shell of the heat exchanger surrounds the outside of tubes 96. For most of tube sheet 94, including tubes 96, this protection is afforded by the boiling water. Preferably ferrules 82 are made of a refractory ceramic material and extend into tubes 92 as far as necessary to protect the metal tubing from exposure to excessively high temperatures.

Referring again to FIG. 1, following heat exchanger 90 is a sulfur condenser 100 for further cooling the process gas and providing for the removal of liquid sulfur product. In processes in which the cooled syngas mixture that emerges from condenser 100 still contains an undesirable amount of unreacted $H_2S$ or other sulfur-containing gas, the assembly may further include a heater 120 and at least one tail gas cleanup unit 130. Suitable processes for use in the tail gas cleanup unit for removing residual sulfur-containing components (e.g., $H_2S$, $SO_2$, COS, $CS_2$ and residual $S^0$ vapor) from a synthesis gas product stream are well known in the art. For instance, a bed of suitable adsorbent (e.g., active carbon or zinc oxide) may be employed. Additionally, a conventional quench tower (not shown) may follow in line after the final tail gas cleanup unit if it is desired to remove water from the gas stream exiting the system.

Figure 3:
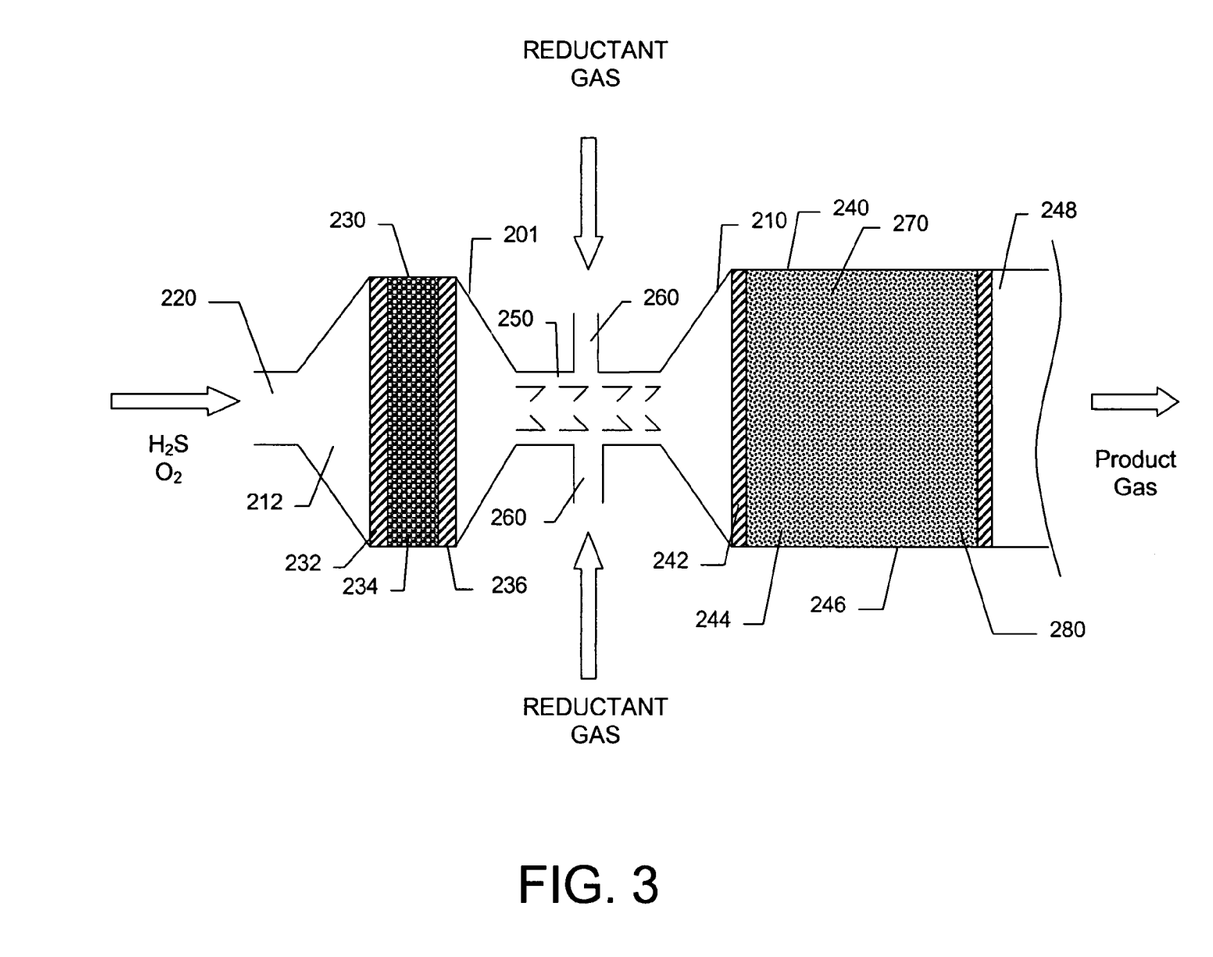
FIG. 3 is a cross-sectional schematic representation showing an embodiment of the present invention employing two reactors.

In an alternative sulfur recovery system, instead of being stacked in a single reactor (FIGS. 1 and 2), the two reaction zones are housed in different reactors. In this case, the first reaction zone 230 and the second reaction zone 240 reside in separate reactor units 201, 210, as illustrated in FIG. 3, instead of in a single reactor. Each catalyst 234, 244 is bounded by respective pairs of thermal barriers 232, 236 and 242, 246. The feed gas mixture enters the first reactor 201 at inlet 220, and the rapidly moving gases contact catalyst 234, react to form $S^0$, $H_2O$, and some $SO_2$ is produced, as described above. Accordingly, the catalytic partial oxidation stage is carried out in reaction zone 230 of reactor 201 and the first stage product gas mixture is combined with the reductant gas stream prior to entry into the second reaction zone 240 contained in reactor 210. The second catalyst 244 is bounded by barriers 242 and 246. Barriers 242, 246 are made of refractory material, are sufficiently porous, and have sufficient mechanical strength to hold the catalyst in place during operation of the system. As shown in FIG. 3, a mixing unit 250 may be placed between the two reactors and the reductant gas stream fed via one or more inlet 260, which may permit more flexibility in combining and providing for thorough mixing of the feed gases for the second stage than the single reactor configuration illustrated in FIG. 2. In some settings it may be preferable to have the option of replacing one catalytic unit without at the same time replacing the other catalytic-unit of a two-reactor assembly. In other situations the single reactor two-stage configuration might be considered simpler and more amenable to high flow rates.

Figure 4:
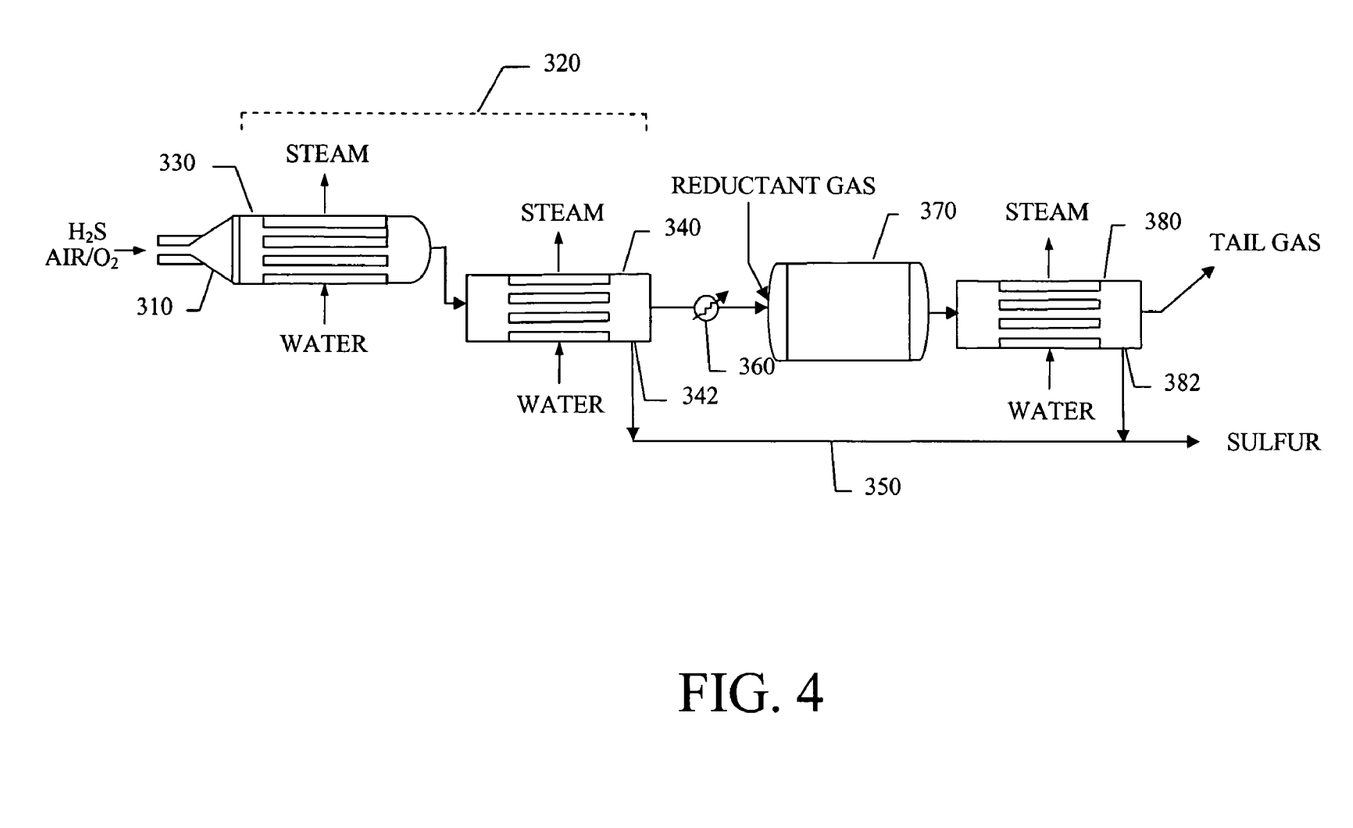
FIG. 4 is a process flow diagram in accordance with an embodiment of the present invention.

Another alternative configuration of a two-stage system places a heat exchanger and sulfur condenser between the first and second stages. FIG. 4 illustrates such a system for condensing sulfur after the first stage (catalytic partial oxidation stage), before the reacted gases enter the second stage (catalytic partial reduction stage). The reactor 310 contains the partial oxidation catalyst and is immediately followed by cooling zone 320 which includes heat exchanger 330 and sulfur condenser 340. A liquid sulfur outlet 342 in condenser 340 feeds into sulfur line 350.

Preferably a heater 360 is located in line between condenser 340 and the intake 372 of second stage reactor 370. The partial reduction catalyst is in second stage reactor 370. Following second stage reactor 370 is another sulfur condenser 380, which may be like condenser 340, and includes an outlet 382 for removing liquid sulfur. As in FIG. 1, a tail gas treatment unit may follow the final sulfur condenser. In some situations, this configuration may be more desirable in order to enhance the efficiency of the partial reduction reactor by removing gaseous elemental sulfur from the process gas entering the partial reduction reactor, so that the reverse Claus reaction (Reaction 9) is less favored in the product gas mixtures.

Process for Recovering Sulfur from an $H_2S$-Containing Stream

Figure 5:
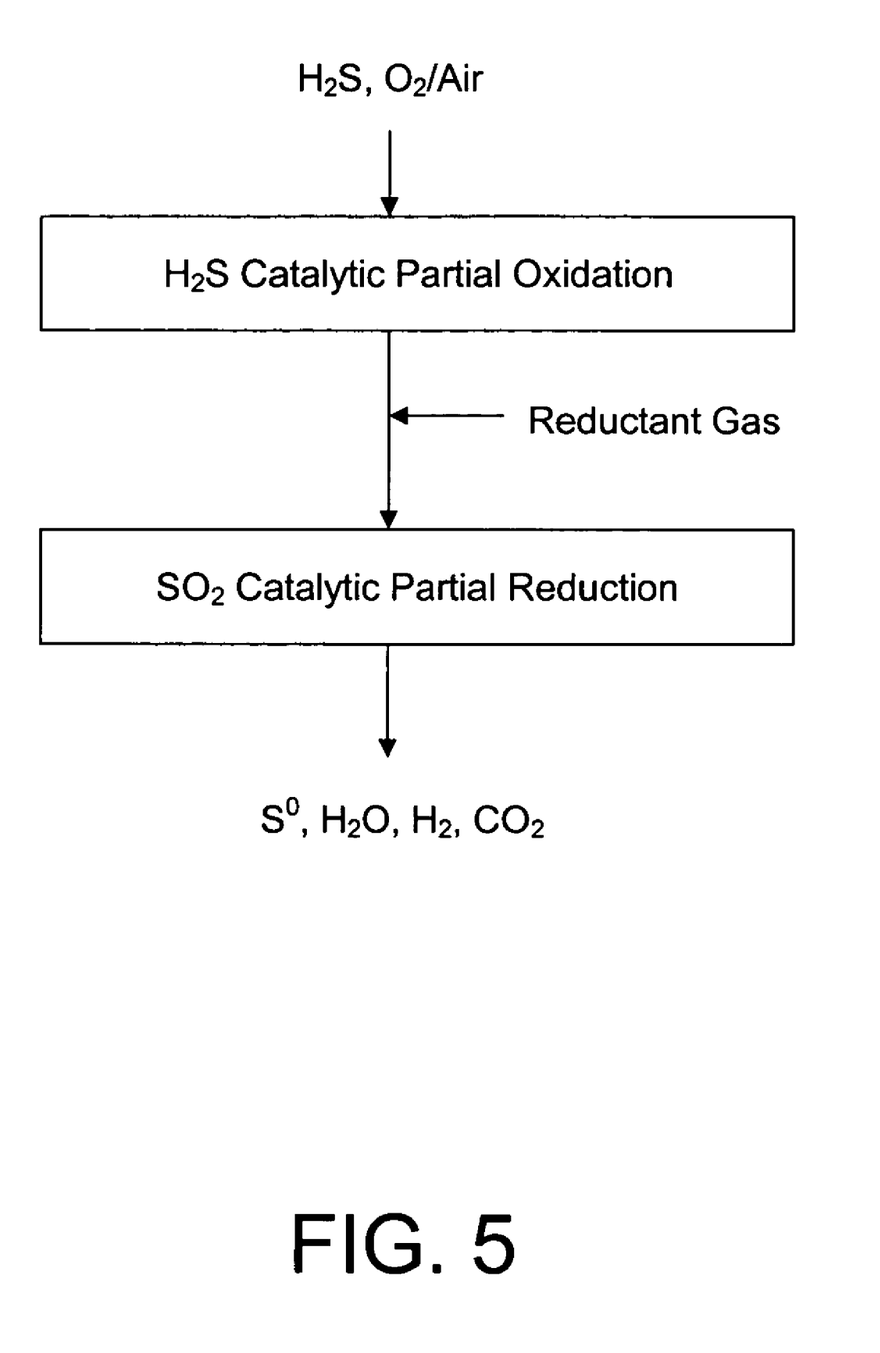
FIG. 5 is a block flow diagram of a basic process for recovering elemental sulfur from an $H_2S$-containing stream.

In an exemplary mode of operation the apparatus of FIG. 1 is set up at a refinery to receive a waste gas stream that contains a level of $H_2S$ which is too great to be safely released into the atmosphere. FIG. 5 is a block flow diagram of a basic process for recovering elemental sulfur from an $H_2S$-containing stream. A feed gas mixture containing $H_2S$ and $O_2$ enters reactor 10 at inlet 20 (FIG. 2). The feed gases may be introduced as a mixture or fed separately and mixed upstream from the first reaction zone 30. A static mixer, such as a group of vanes projecting from the walls of an a concentric perforated pipe, may be employed. The initial $H_2S$-containing stream may contain, for example, as little as about 1% $H_2S$, or it could contain 3–40% $H_2S$ as found in many natural gas plant amine acid gases, or it may even be an acid gas stream containing up to 100% $H_2S$ (by volume). The minimum concentration of $H_2S$ in the $H_2S$-containing feed is that which will provide the minimum partial vapor pressure of gaseous elemental sulfur needed to condense sulfur liquid under the selected operating conditions of the process. The $H_2S$ containing stream and the $O_2$-containing stream may be introduced together as a rapidly flowing feed gas mixture or they may be fed separately into the reactor and mixed immediately upstream from the first reaction zone 30. Molecular oxygen may be provided in the form of air, pure oxygen, or an air/oxygen mix. If the $H_2S$-containing gas and the $O_2$-containing gas are introduced separately, the feed injection openings can be configured in any of a number of different ways without affecting the principles or operation of the present system. A static mixer, such as a group of vanes projecting from the walls of an a concentric perforated pipe, is one suitable option. The reactor may include a mixing zone 12 immediately upstream from barrier 32. Void spaces in the reactor are preferably avoided so as to minimize the occurrence of undesirable gas phase reactions between the feed gas components before entering reaction zone 30. As discussed in more detail below, preferably the molar ratio of $O_2$:$H_2S$ is about 0.6:1 or greater.

Prior to contacting the partial oxidation catalyst in the first reaction zone, the feed gas mixture is shielded by radiation barrier 32 from heat that is generated downstream in the process in first reaction zone 30. Preferably the temperature of the feed gas mixture is increased up to about 200° C. to facilitate initiation of the reaction by preheating at least one of the feeds. Preferably the gases are thoroughly mixed to deter combustion reactions from taking place excessively or predominating in the first reaction zone to form an excessive amount of $SO_2$. The contact time between the oxygen and $H_2S$ is preferably minimized to prevent having a stagnant explosive mixture form in the reactor. Minimum contact time between the $O_2$ and $H_2S$ is facilitated by placing inert filler in any void spaces in the piping upstream of the reaction zone.

The contact time of the feed gas stream with the first catalyst is preferably less than about 200 milliseconds. For example, it may be only 20–50 milliseconds, or even 10 milliseconds or less when operating the system at very high flow rates. When referring to a wire gauze catalyst, the contact time may be calculated as the wire diameter divided by the feed gas stream velocity at inlet conditions (i.e., temperature and pressure at the inlet to the reactor). When employing a catalyst monolith or packed bed of divided catalyst, the surface area, depth of the catalyst bed, and gas flow rate (space velocity) are preferably managed to ensure the desired short contact time (i.e., 200 milliseconds or less). It is well known that contact time is inversely proportional to the "space velocity," as that term is customarily used in chemical process descriptions, and is typically expressed as volumetric gas hourly space velocity in units of $h^{-1}$. Preferably the partial oxidation of $H_2S$ in the first reaction zone is carried out at superatmospheric pressure (i.e., greater than 1 atmosphere (100 kPa), and the gas hourly space velocity (GHSV) is at least 20,000 $h^{-1}$, preferably at least 100,000 $h^{-1}$. Satisfactory conversion of $H_2S$-containing gas streams flowing at GHSVs of 25,000,000–100,000,000 $h^{-1}$, are expected to be attained at pressures up to 10,000–32,000 kPa (100–320 atmospheres) with the present process and apparatus.

After the rapidly moving feed gas mixture passes barrier 32 it flows past catalyst 34 in reaction zone 30 and contacts the catalyst where it becomes instantaneously heated sufficiently to initiate an oxidation reaction, the temperature quickly reaching the range of 700° C.–1,500° C., preferably 850° C.–1,450° C. as the partial oxidation reaction proceeds. The catalyst bed 34 is heated as a result of the exothermic chemical reaction occurring at its surface and maintains the stated SPOC™ reaction temperature range. Care is taken to avoid contacting the catalyst with the feed gas at a temperature at or below the dewpoint of sulfur. In some cases it may be helpful to heat catalyst 34 with external means at startup of the process, so as to initiate the exothermic oxidation reactions on the catalyst. This initial heating (e.g., to about 500° C.) can also be accomplished by briefly spiking the feed gas mixture with a readily oxidizable gas (e.g., a light hydrocarbon) to heat up the catalyst sufficiently to initiate the $H_2S$ partial oxidation reaction. Once the reactor is running, the first stage (the partial oxidation stage) is preferably autothermal (i.e., the exothermic partial oxidation reaction supplies the heat needed to perpetuate the partial oxidation reaction). The rapid heating of the reactant gas mixture as a result of contact with the hot catalyst promotes fast reaction rates. Maintaining the preferred <200 millisecond range dwell time of the reactant gas mixture on the catalyst produces a favorable balance between temperature elevation due to the exothermic partial oxidation reaction and the convective removal of heat from the reaction zone 30 by the rapidly moving product gas stream. Thus, sufficient heat is generated to maintain the catalyst temperature in the range of 700° C.–1,500° C., more preferably in the range of about 850° C.–1,450° C.

The catalyzed reaction goes quickly by the direct partial oxidation of the $H_2S$ to form sulfur and water according to Reaction 7. The most likely value for x in Reaction 7 at the preferred temperatures and pressures of the presently disclosed process is x=2. Small amounts of light hydrocarbon will likely be partially oxidized at the same time to CO and $H_2$ under the $H_2S$ catalytic partial oxidation reaction conditions, if the catalyst in reaction zone 30 possesses at least some activity for catalyzing the partial oxidation reaction. Preferably the first stage (SPOC™) carried out in reaction zone 30 is optimized such that the conversion of the $H_2S$ component to gaseous elemental sulfur is maintained at the maximum possible level (i.e., the produced elemental sulfur is not lost through oxidation to $SO_2$.) Optimization of the reaction includes adjusting the $O_2$ concentration in the feed gas mixture to an $O_2/H_2S$ molar ratio of 0.51:1 to about 0.75:1. This relative amount of $O_2$, which is in excess of the stoichiometric amount of the 0.5 molar ratio of Reaction 7, is preferred for achieving maximum conversion of $H_2S$ to elemental sulfur without causing an excessive amount of conversion of the gaseous $S^0$ to $SO_2$ in the first reaction zone. If air is used as the $O_2$-containing feed instead of pure oxygen, the ratio of air:$H_2S$ is preferably 2.4 to 3.6 (vol/vol). For example, at a ratio of 0.68:1 ($O_2$:$H_2S$), 100% of the $H_2S$ is converted in the first stage, and the first stage product gas mixture contains at least 65% (of the original sulfur content of the $H_2S$) as $S^0$, and no more than about 35% (of the original sulfur content of the $H_2S$) as $SO_2$. Thus the feed to the second (reduction) stage contains $S^0$, $SO_2$, $H_2$ and $H_2O$ with at most only a small amount of $H_2S$. Depending on the composition of the feed stocks, other incidental components of the gas mixture emerging from the SPOC™ stage can include COS, $CS_2$, $N_2$, $CO_2$ and CO.

The rapidly flowing gases exit reaction zone 30 through barrier 36 and enter a mixing zone 70 into which is co-fed via inlet 60 a reductant gas stream such as CO, $CH_4$ or natural gas. Mixing zone 70 may include a static mixer or other means to ensure that the reductant gas is thoroughly mixed with the first stage product gas mixture emerging from reaction zone 30 prior to contacting the second catalyst 44 in reaction zone 40 where the second stage processing occurs. Thus, the first stage product gas mixture containing primarily $S^0$, $H_2O$ and $SO_2$ is mixed with a reductant gas (such as CO, $CH_4$ or natural gas) and contacted with a second catalyst in the second reaction zone. The space velocity over the second catalyst is less than or equal to the space velocity over the first catalyst. In reaction zone 40 the $SO_2$ component is partially reduced to form $S^0$ and $CO_2$. Preferably the carbon to $SO_2$ molar ratio in the reductant gas/first stage product gas mixture is about 1:0.3 to about 1:2.5. The temperature of the second stage reaction zone is above the dewpoint of sulfur, preferably in the range of about 350–1,200° C., more preferably in the range of 500–800° C. It is believed that when the reductant gas is CO, with C:$SO_2$=1:0.5, the main reaction that take place in the second stage is:

$$2CO+SO_2 \rightarrow 2CO_2+\tfrac{1}{2}S_2 \qquad (9)$$

and when $CH_4$ is the reductant gas, with C:$SO_2$=1:2, the main reaction is believed to be:

$$CH_4+2SO_2 \rightarrow CO_2+2S+2H_2O \qquad (10)$$

During the catalytic partial reduction of the $SO_2$ component, there is little or no effect on the other first stage products, which are primarily gaseous elemental sulfur and water. The final product gas mixture emerging from reaction zone 40 contains primarily $S^0$, $N_2$ and $H_2O$ with minimal amounts of $CO_2$, $SO_2$ and $H_2S$. Preferably the $S^0$ in the stream is greater than 90% of the sulfur contained in the $H_2S$ in the feed, and more preferably above 99% by volume. Incidental components in the product gas mixture from stage two may include small amounts of $H_2$, COS, $CS_2$, CO and $CH_4$. The first stage reaction (SPOC™) is exothermic, as discussed above, and the reduction of $SO_2$ requires elevated temperatures, above 600° C. Thus, energy integration is achieved in the preferred mode of operation, leading to essentially auto-thermal operation. The reactor, containing both reaction zones, is preferably operated adiabatically (i.e., without the loss of heat aside from convective losses in the exiting gas). When separate reactors are used for the two stages, as illustrated in FIGS. 3 and 4, each reactor is preferably operated autothermally/adiabatically. This is achieved, at least in part, by optimizing the gas flow rates and the distance between the first and second reactors or catalyst beds.

From reaction zone 40, the reacted gases enter cooling zone 110 (as shown in FIG. 1) which includes the second stage product gas zone 80 followed by a heat exchanger 90 and then a sulfur condenser 100. The thermal barrier 46 shields the reacted gases from the hot catalyst and the temperature of the reacted gases starts to decline. In heat exchanger 90 the product gases from the second stage reaction zone are cooled in the thermally conductive tubes 96 to below 425° C. and preferably to below about 340° C., but not below the dew point of sulfur. The water surrounding tubes 96 is raised to its boiling point by heat conducted away from the hot gas through tubes 96. It is preferable to capture the evolved steam for secondary use. Since the boiling water remains at a constant temperature, and since the metal conducts heat so readily, tubes 96 and most of tube sheet 94 attain temperatures only slightly above the temperature of boiling water. This is not the case for the portions of tube sheet 94 where tubes 96 connect at joints 92, however. Without thermal protection, these joints and the first part of the tube would see temperatures far exceeding the safe operating limits for the metal. The refractory covering 84 and heat resistant ferrules 82 provide insulation for these relatively unprotected areas of metal. Thus, only metal surfaces that are adequately exposed to the circulating water will encounter the hot gases. The rapid cooling that occurs in the boiler drops the temperature of the reacted gases to below about 425° C. and thus ceases the chemical reactions. The water vapor, gaseous elemental sulfur, and $CO_2$, plus any incidental gases or combustion products, flow from heat exchanger 90 into sulfur condenser 100, where they are cooled further until the dew point of elemental sulfur is reached. High levels of conversion and the lack of $SO_2$ in the product stream after second stage processing will usually make it unnecessary to proceed to tail gas treatments in order to achieve an acceptable level of desulfurization in the resulting gas stream. The liquid sulfur that forms in sulfur condenser 90 may be removed from the condenser by way of outlet 102.

Under the preferred optimal operating conditions, and when only a minor amount of other gases are present in the $H_2S$ rich gas feed, the desulfurized gas emerging from the condenser may be safely vented into the atmosphere without constituting an environmental burden. In some situations, however, such as where the $H_2S$-containing feedstock contains an appreciable amount of contaminating gases, it may be desirable to remove even very low levels of sulfurous or other components before the residual gases are vented into the atmosphere. In such case, the gas leaving sulfur condenser 90 may be reheated by heater 120 and sent to tail gas treatment unit 130, as shown in FIG. 1, or a series of tail gas treatment units, if necessary for a particular application. Suitable conventional tail gas treatment units are well known in the art (e.g., absorbents such as chelated iron, iron oxide, zinc oxide, sodium nitrite, or a basic aqueous solution). The desulfurized gas emerging from the system is preferably in suitable condition for venting into the environment.

Referring again to FIG. 3, in instances where the process is carried out using separately housed first and second reaction zones 230, 240, it is preferable to ensure thorough mixing of the added reductant gas with the process gas exiting the catalytic partial oxidation reactor 230. Likewise, when the apparatus is configured as shown in FIG. 4. By interposing a sulfur condenser 342 between heat exchanger 330 and the second stage reaction zone (reactor 370) the partial reduction reaction is made more efficient by eliminating a large part of the elemental sulfur produced in the first reaction zone. As a result of removing liquid sulfur product after the first stage reaction, the occurrence of the undesired reaction of gaseous $S^o$ with water to produce $H_2S$ and $SO_2$ (according to reaction (2), the "reverse Claus reaction") is decreased. Thus, the overall efficiency of converting $H_2S$ to elemental sulfur is enhanced.

When using any of the configurations illustrated in FIGS. 1–5, ensuring $H_2S$ catalytic partial oxidation reaction promoting conditions in the first reaction zone is highly preferred. This may include adjusting the relative amounts of $H_2S$, $O_2$ and other oxidizable components (e.g., hydrocarbon) in the feed gas mixture. For example, an amount of $O_2$ in excess of the otherwise preferred minimum 0.51 molar ratio of $O_2$:$H_2S$ (first stage reactants) is preferably provided if the $H_2S$-containing feed also contains a light hydrocarbon or another oxidizable compound that consumes oxygen under the same process conditions. Reaction promoting conditions may also include adjusting the amount of preheating of the reactant gas mixture and/or the catalyst, adjusting the operating pressure of the reactor, which is preferably maintained above atmospheric pressure. Increasing or decreasing the space velocity of the feed gas mixture, which is influenced not only by pressure and temperature but also by the configuration of the catalyst bed, its porosity and the associated pressure drop, also can be used to favor the $H_2S$ partial oxidation reaction.

Additionally, the efficiency of the first stage conversion can be further increased, if desired, by modifying the first stage reaction zone to permit staging of air/$O_2$ addition to the catalyst/$H_2S$, whereby production of $SO_2$ in the first stage is decreased compared to a non-staged air process. A suitable staged air/oxygen catalytic partial oxidation process for converting $H_2S$ to elemental sulfur is described in concurrently filed U.S. patent application Ser. No. 10/758,465 and is hereby incorporated by reference.

By reducing the amount of equipment necessary to obtain a high level of sulfur recovery from an $H_2S$ containing feed gas, the total pressure drop through the sulfur plant can be greatly reduced. Control of $H_2S$, oxygen and reductant gas feeds is maintained using standard sulfur plant equipment, such as air demand analyzers, feed back control and the like. Since Claus plants are normally limited by the amount of pressure drop due to the low pressure operation, the present system advantageously allows for capacity expansion by retrofit of existing Claus plants. The new short contact time sulfur recovery processes and the simplified sulfur process plants described herein are suitable for use in most refinery or gas plant applications where processes such as hydrotreaters, cokers and fluid catalytic crackers generate $H_2S$-containing waste gases and desulfurization is needed before the waste gas can be safely vented into the atmosphere. As a result of using the present system, there is minimal direct stack emission from the sulfur recovery unit into the air surrounding the plant.

$H_2S$ Partial Oxidation Catalysts (First Stage Catalysts)

Referring again to FIG. 2, for simplicity the catalyst 34 of first reaction zone 30 is depicted as a particle bed. It could also be one or more wire mesh or gauze layer, a monolith or a particle bed containing any of a variety of geometries. The catalyst is preferably configured so that only a first fraction of the feed gas mixture contacts the catalytically active surfaces while the balance of the reactant gas mixture serves to quickly cool the first fraction and prevent the oxidation reaction from proceeding too far in the first reaction zone. The catalyst may be formed entirely of catalytic material, or it may comprise one or more catalytic components supported on a non-catalytic refractory support. When the catalyst is in the form of a gauze, it is preferably one or more layers of a substantially planar, flexible woven metal-containing or metal-coated screen or gauze having about 20–120 mesh. More preferably, it is a single gauze of metal wires, or a short stack of gauzes, of diameter compatible with the diameter of the reactor. In a laboratory scale reactor about 25 cm in length, the catalysts are preferably about 25 micrometers (μm) to about 2.5 millimeters (mm) in diameter.

Metal Gauzes. One type of catalyst is in the form of one or more layers of substantially planar, flexible woven metal-containing or metal-coated screen or gauze having about 20–120 mesh and diameter compatible with the inner diameter of the reactor. Suitable metals that may be formed into a gauze or deposited onto a non-catalytic gauze support include platinum, rhodium, ruthenium, iridium, nickel, palladium, iron, cobalt, rhenium and rubidium, or a mixture of any of those metals. Some of the more preferred gauze-type catalysts are made of about 87–93% by weight (wt %) Pt and about 7–13 wt % Rh (wt % based on total weight of the catalyst device). Alternative catalyst structures or devices may be in the form of one or more perforated disks, honeycomb-like structures, etched foils or any other suitably active structure that provides the desired gas flow rate to effect the desired partial oxidation.

Rh on a Ln-modified Refractory Support. Another type of catalyst that is active for catalyzing the direct partial oxidation of $H_2S$ to elemental sulfur comprises about 0.005 to 25 wt % Rh, preferably 0.05 to 25 wt % Rh, and about 0.005 to 25 wt % of a lanthanide element (i.e., La, Ce, Pr, Nd, Pm, Sm, Eu, Gd, Tb, Dy, Ho, Er, Tm, Yb and Lu), preferably samarium, ytterbium or praseodymium, in the form of the metal and/or metal oxide coating a refractory monolith or a plurality of distinct or discrete structures or particulates. One such Rh-Ln catalyst contains about 0.5–10 wt % Rh and about 0.5–10 wt % Sm on a refractory support, especially where the ratio of rhodium to Sm is in the range of about 0.5–2. For example, an active $H_2S$ partial oxidation catalyst is prepared by depositing Rh (e.g., 2–6 wt. %) onto a layer of Sm (e.g., 3–6 wt. %) that coats a partially stabilized (MgO) zirconia ("PSZ") monolith, which contains about 45–80 pores per linear inch. Weight percentages (wt %) refer to the amount of metal component relative to the total weight of the catalyst, including the support, if any.

Pt—Rh Alloy on Ln-modified Refractory Support. While many of the above-described catalyst compositions have demonstrated good activity for catalyzing the partial oxidation of $H_2S$, and are satisfactory for a number of SPOC™ applications, it was observed that some metals, such as Rh, suffer from deactivation with extended on stream use due to the formation of sulfur deposits and/or metal sulfide formation that removes the active catalytic form. The surprising discovery was made that this problem is greatly improved or solved completely by combining platinum with rhodium in the catalyst. An especially good catalyst that is highly stable and active for catalyzing the direct partial oxidation of high concentrations of $H_2S$ in a gas stream to elemental sulfur and water contains both platinum and rhodium supported on a samarium-modified refractory support such as the above-described supports and materials. A highly preferred catalyst is prepared by depositing about 0.1%–6 wt % Pt onto about 3–6 wt % Rh, which was previously deposited onto an approximately 3–5 wt % lanthanide oxide, preferably samarium oxide, coated refractory support (wt % based on total weight of the supported catalyst). A preferred support is alumina granules, more preferably alpha-alumina. In the present investigations, the surprising synergy between the Pt and Rh components enhanced catalyst stability under $H_2S$ catalytic partial oxidation reaction conditions, and when further combined with a lanthanide or lanthanide oxide promoter provides an even better catalyst for converting hydrocarbon-containing $H_2S$ streams. Catalyst stability refers to resistance to (a) deactivation due to carbon or sulfur deposition, (b) chemical reaction between sulfur and the catalytic components and (c) volatilization of precious metal at reaction conditions. The stability is typically shown by a consistent and reproducible catalytic performance (e.g., $S^o$ yield with $H_2S$ feed).

The above-described Pt—Rh based catalysts are preferably in the form of either a wire gauze, a foam monolith, or in the form of a catalytically active material dispersed or deposited on a refractory support containing zirconia, alumina, cordierite, titania, mullite, zirconia-stabilized alumina, MgO stabilized zirconia, MgO stabilized alumina, niobia or a mixture of any of those materials, or another suitable refractory material. For example, the catalyst can be structured as, or supported on, a refractory oxide "honeycomb" straight channel extrudate or monolith, made of cordierite or mullite, or other configuration having longitudinal channels or passageways permitting high space velocities with a minimal pressure drop. Such configurations are known in the art and described, for example, in *Structured Catalysts and Reactors*, A. Cybulski and J. A. Moulijn (Eds.), Marcel Dekker, Inc., 1998, p. 599–615 (Ch. 21, X. Xu and J. A. Moulijn, "Transformation of a Structured Carrier into Structured Catalyst"), which is hereby incorporated herein by reference.

A more preferred catalyst geometry comprises granules prepared by impregnating or washcoating the catalytic components, or their precursors, onto lanthanide coated refractory granules, calcining and reducing the catalyst, using techniques that are well known in the art. A catalyst bed for a the $H_2S$ catalytic partial oxidation process may comprise a quantity of such impregnated or coated granules, or other forms of support such as beads, pills, pellets, cylinders, trilobes, extrudates, spheres, other rounded shapes or other manufactured configurations, or irregularly shaped particles. The supports preferably comprise a refractory material such as zirconia, alumina, cordierite, titania, mullite, zirconia-stabilized alumina, MgO stabilized zirconia, MgO stabilized alumina, niobia or a mixture of any of those materials, or another suitable refractory material. Alumina is preferably in the form of alpha-alumina, however the other forms of alumina have also demonstrated satisfactory performance.

The Pt—Rh/Ln catalyst also has superior activity for converting an $H_2S$ stream containing a light hydrocarbon, such as methane, to elemental sulfur and synthesis gas, by way of concurrent CPOX and SPOC™ reactions carried out over the same catalyst in a single reaction zone, operating the reactor at hydrocarbon, $H_2S$ and $O_2$ concentrations and process conditions that favor the formation of both sulfur, CO and $H_2$, as described in co-owned U.S. patent application Ser. No. 09/742,999 (now U.S. Pat. No. 6,579,510), which is hereby incorporated herein by reference.

Carbided Pt/Rh on a Refractory Support. Another unexpected discovery was that the gradual deactivation of rhodium, and others among the above-named SPOC™ catalysts, was also improved by carbiding the catalyst under gaseous hydrocarbon flow before, after or during the $H_2S$ flow, under CPOX-promoting reaction conditions. An especially active catalyst that provides improved performance for converting $H_2S$ to sulfur by direct partial oxidation (the $H_2S$ partial oxidation process) is prepared by carbiding a Pt—Rh catalyst before exposing the catalyst to $H_2S$.

The carbiding process includes exposing the catalyst, in any of the forms described above, to light hydrocarbon (a $C_1$–$C_5$ hydrocarbon, preferably methane, ethane, propane or butane) under CPOX reaction conditions as described in U.S. patent application Ser. No. 09/742,999. Preferably this hydrocarbon pre-treatment procedure (referred to herein as "carbiding") is carried out with the catalyst in place in the short contact time reactor. The carbiding treatment includes heating the catalyst to at least 700° C. or up to about 1,500° C., preferably in the range of 850° C.–1,450° C., in the presence of the light hydrocarbon. Upon getting the catalyst up to catalytic partial oxidation operating temperature, the flow of hydrocarbon is stopped and the flow of $H_2S$ containing gas is begun for sulfur removal and recovery under SPOC™ operating conditions. It is preferable to perform the carbiding treatment before exposing the catalyst to $H_2S$ or other sulfur compound while the catalyst is at a temperature at which it can chemically react with sulfur or at which sulfur can condense on its active sites. In the carbiding treatment, it is preferable to mix the hydrocarbon with a small amount of oxygen or $O_2$-containing gas to deter or minimize coking of the catalyst during treatment. The amount of oxygen preferably does not exceed the stoichiometric amount necessary to support catalytic partial oxidation of the hydrocarbon (CPOX reaction), i.e., a carbon:oxygen molar ratio of 2:1. If the catalytic components are also active for catalyzing the CPOX reaction, production of synthesis gas (CO and $H_2$) may commence during the pre-treatment step upon reaching a temperature sufficient to initiate the reaction. Without wishing to be bound by any particular theory, it is believed that, in the case of a Pt—Rh alloy catalyst, the formation of Rh and/or Pt carbide in which at least a substantial portion of the catalytic metal component exists in the same phase with carbon (e.g., $RhC_x$ or $PtC_x$), which resists the formation of metal sulfide(s) that can deactivate the catalyst by covering the active centers. Thus, the stability and life of the catalyst on $H_2S$ stream is increased or enhanced by the carbiding treatment.

Test Procedure for Evaluating Catalyst Performance

Representative catalysts were evaluated for their ability to catalyze the SPOC™ reaction in a modified conventional flow apparatus using a quartz reactor with a length of 12 inches, an outside diameter of 19 mm and an inside diameter of 13 mm. Ceramic foam pieces of 99% $Al_2O_3$ (12 mm outside diameter×5 mm thick, with 45 pores per linear inch) were placed before and after the catalyst as radiation shields. The catalyst bed contained 4 grams by weight of catalyst (volume about 0.1963 $in^3$), and was approximately 12 mm in diameter×4 cm in length (about 0.5 in.×1.5 in.), including the radiation shields. The inlet radiation shield also aided in uniform distribution of the feed gases. An Inconel-sheathed, single point K-type (Chromel/Alumel) thermocouple was placed axially inside the reactor, touching the top (inlet) face of the radiation shield. A high temperature S-Type (Pt/Pt 10% Rh) bare-wire thermocouple was positioned axially touching the bottom face of the catalyst, and was used to indicate the reaction temperature. The catalyst and the two radiation shields were tightly sealed against the inside walls of the quartz reactor by wrapping the shields radially with a high purity (99.5%) alumina paper. A 600-watt band heater set at 90% electrical output was placed around the quartz tube, providing heat to light off the reaction and preheat the feed gases. The bottom of the band heater corresponded to the top of the upper radiation shield.

The runs were conducted at the volumetric air to $H_2S$ ratios indicated in Table 1. The reactor effluent was analyzed using a gas chromatograph equipped with a thermal conductivity detector. The data reported in Table 1 were obtained after approximately 1 hour on stream at the specified conditions. All metal loadings are indicated as wt % relative to the support weight.

$SO_2$ also results from increased air:$H_2S$ ratio. The two-stage sulfur recovery process preferably includes (1) selecting an efficient first catalyst, (2) adjusting the $O_2$:$H_2S$ ratio of the feed such that $H_2S$ conversion is complete and the amount of $SO_2$ produced is manageable, (3) selecting an efficient second catalyst, and (4) operating the process at flow rate/contact times for each catalyst that favor the desired reactions. In this way, the total conversion of $H_2S$ is achieved, the sulfur product is close to 100% in the form of elemental sulfur, and the amount of $SO_2$ contaminant in the waste gas stream is minimal.

$SO_2$ Partial Reduction Catalysts (Second Stage Catalysts)

The catalyst employed in the second reaction zone to carry out the second stage of the sulfur recovery process is active for selectively catalyzing the reduction of $SO_2$ to elemental sulfur according to Reaction (8). The catalyst can have any of the physical forms (e.g., monolith, metal gauze,

TABLE 1

| (First) Catalyst Composition | $H_2S$ flowrate (SLPM) | Air flowrate (SLPM) | Air/$H_2S$ molar ratio | $H_2S$ conv | $S^0$ yield | $SO_2$ yield | Total flowrate (SLPM) | Total flowrate (in$^3$h$^{-1}$) | GHSV (h$^{-1}$) |
|---|---|---|---|---|---|---|---|---|---|
| 4 Pt/1 Rh/3 Mg on | 1.15 | 2.78 | 2.43 | 82.57 | 71.65 | 10.92 | 3.93 | 14385.66 | 73284 |
| MgO granules (30 | 1.15 | 2.90 | 2.53 | 83.70 | 71.27 | 12.41 | 4.04 | 14806.72 | 75429 |
| mesh) | 1.15 | 3.02 | 2.62 | 84.89 | 70.86 | 14.00 | 4.17 | 15249.75 | 77686 |
|  | 1.15 | 3.13 | 2.73 | 85.69 | 70.04 | 15.65 | 4.28 | 15656.17 | 79756 |
|  | 1.15 | 3.25 | 2.83 | 86.55 | 69.38 | 17.15 | 4.39 | 16088.21 | 81957 |
| 1 Ir/4 Rh/3 Mg on | 1.06 | 2.512 | 2.37 | 86.01 | 73.64 | 12.37 | 3.57 | 13078.54 | 66625 |
| fused alpha- | 1.06 | 2.721 | 2.57 | 87.29 | 71.77 | 15.52 | 3.78 | 13843.77 | 70524 |
| alumina pills (20–30 mesh) | 1.06 | 2.932 | 2.77 | 88.62 | 69.37 | 19.25 | 3.99 | 14616.33 | 74459 |
|  | 1.061 | 3.142 | 2.96 | 89.72 | 67.47 | 22.25 | 4.20 | 15388.88 | 78395 |
|  | 1.06 | 3.352 | 3.16 | 90.41 | 64.05 | 26.36 | 4.41 | 16154.12 | 82293 |
|  | 1.06 | 3.561 | 3.36 | 91.13 | 60.92 | 30.22 | 4.62 | 16919.35 | 86191 |
| 0.5 Pt/4 Rh/1 Pt/3 Mg | 0.76 | 1.523 | 2.00 | 72.66 | 66.66 | 5.98 | 2.28 | 8358.99 | 42583 |
| on fused alpha- | 0.762 | 1.593 | 2.09 | 73.90 | 67.09 | 6.79 | 2.36 | 8622.61 | 43926 |
| alumina spheres | 0.766 | 1.667 | 2.18 | 74.96 | 67.02 | 7.90 | 2.43 | 8908.20 | 45381 |
| (1/16 in. D) | 0.762 | 1.725 | 2.26 | 77.13 | 68.12 | 8.97 | 2.49 | 9105.91 | 46388 |
|  | 0.754 | 1.818 | 2.41 | 78.39 | 67.88 | 10.47 | 2.57 | 9417.13 | 47973 |
|  | 0.763 | 1.892 | 2.48 | 79.43 | 67.39 | 12.02 | 2.66 | 9721.03 | 49521 |
|  | 0.761 | 1.969 | 2.59 | 81.27 | 68.13 | 13.14 | 2.73 | 9995.64 | 50920 |
|  | 0.762 | 2.043 | 2.68 | 82.09 | 67.41 | 14.69 | 2.81 | 10270.24 | 52319 |
|  | 0.765 | 2.12 | 2.77 | 83.09 | 67.08 | 15.96 | 2.89 | 10563.15 | 53811 |
|  | 0.761 | 2.116 | 2.78 | 83.33 | 66.50 | 16.82 | 2.88 | 10533.86 | 53662 |
|  | 0.761 | 2.264 | 2.98 | 85.60 | 67.14 | 18.46 | 3.03 | 11075.75 | 56423 |
|  | 0.759 | 2.341 | 3.08 | 86.09 | 65.41 | 20.66 | 3.10 | 11350.35 | 57821 |
|  | 0.763 | 2.415 | 3.17 | 86.65 | 63.92 | 22.69 | 3.18 | 11635.94 | 59276 |
|  | 0.765 | 2.485 | 3.25 | 87.74 | 63.85 | 23.84 | 3.25 | 11899.57 | 60619 |
|  | 0.764 | 2.566 | 3.36 | 88.00 | 61.53 | 26.47 | 3.33 | 12192.48 | 62111 |
|  | 0.767 | 2.639 | 3.44 | 88.46 | 60.36 | 28.05 | 3.41 | 12470.74 | 63529 |
|  | 0.763 | 2.715 | 3.56 | 88.93 | 58.81 | 30.09 | 3.48 | 12734.37 | 64872 |
|  | 0.766 | 2.792 | 3.64 | 89.62 | 58.28 | 31.34 | 3.56 | 13027.28 | 66364 |
|  | 0.662 | 2.487 | 3.76 | 90.31 | 58.19 | 32.12 | 3.15 | 11529.76 | 58735 |
| 4 Pt/1 Rh/3 Mg on | 0.75 | 1.82 | 2.44 | 74.91 | 58.69 | 16.22 | 2.56 | 9387.84 | 47824 |
| alpha-alumina fiber | 0.75 | 1.97 | 2.64 | 79.19 | 60.76 | 18.43 | 2.72 | 9948.04 | 50678 |
| disks (1/16 in. L × 1/2 in. D) | 0.75 | 2.05 | 2.74 | 80.71 | 61.03 | 19.64 | 2.79 | 10222.64 | 52077 |
| (stack of | 0.75 | 2.12 | 2.82 | 82.20 | 61.28 | 20.92 | 2.87 | 10500.91 | 53494 |
| 6 disks) | 0.75 | 2.20 | 2.93 | 83.28 | 60.93 | 22.32 | 2.94 | 10775.51 | 54893 |
|  | 0.75 | 2.27 | 3.04 | 84.19 | 60.26 | 23.93 | 3.02 | 11050.12 | 56292 |

It can be seen in Table 1 that the catalyst containing (molar ratios) 4 Pt/1 Rh/3 Mg on MgO granules (30 mesh) performed better than the catalyst containing 1 Ir/4 Rh/3 Mg on fused alpha-alumina pills. The catalyst containing 0.5 Pt/4 Rh/1 Pt/3 Mg on fused alpha-alumina spheres provided acceptable activity and demonstrated activity over a wide window of air:$H_2S$ ratios. The composition containing 4 Pt/1 Rh/3 Mg on alpha-alumina fiber disks is a less desirable catalyst. The data shown in Table 1 indicate that as the air:$H_2S$ ratio in the feed increases, $H_2S$ conversion also increases. These data also show that increased production of granules) described above with respect to the first catalyst. The catalytic components differ, however, such that the second catalyst is active for catalyzing the partial reduction of $SO_2$ to elemental sulfur. Suitable catalyst compositions are single or mixed metal oxides containing one or more alkaline earth (e.g., Be, Mg, Ca, Sr and Ba) or lanthanide metal (e.g., La, Ce, Pr, Nd, Pm, Sm, Eu, Gd, Tb, Dy, Ho, Er, Tm, Yb and Lu) of the Periodic Table of the Elements (CRC HANDBOOK OF CHEMISTRY AND PHYSICS, 82nd ed., 2001–2002). The catalyst may additionally contain a precious metal promoter (i.e., Ag, Au, Pd, Pt, Rh, Ru, Os, Ir). A preferred composition contains 1–20 wt % alkaline earth oxide or lanthanide oxide, or a combination of both, on an inert refractory support. Optionally, the catalyst may also contain 0.05–10 wt % precious metal.

Definitions. As used herein, the term "about" or "approximately," when preceding a numerical value, has its usual meaning and also includes the range of normal measurement variations that is customary with laboratory instruments that are commonly used in this field of endeavor (e.g., weight, temperature or pressure measuring devices), preferably within ±10% of the stated numerical value.

The terms "discrete" or "divided" structures or units refer to catalyst devices or supports in the form of divided materials such as granules, beads, pills, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures have a maximum characteristic length (i.e., longest dimension) of less than 25 millimeters, preferably less than five millimeters.

The term "monolith" refers to any singular piece of material of continuous manufacture such as solid pieces of metal or metal oxide or foam materials or honeycomb structures. Two or more such catalyst monoliths may be stacked in the catalyst zone of the reactor if desired. In any case, the catalyst has sufficient porosity, or sufficiently low resistance to gas flow, to permit a stream of the reactant gas mixture to be in contact with the catalyst not to exceed 10 seconds, more preferably less than 1 second and still more preferably less than 200 milliseconds, when the reactor is operated to recover elemental sulfur from an $H_2S$ containing gas.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. The discussion of a reference in the Description of Related Art is not an admission that it is prior art to the present invention, especially any reference that may have a publication date after the priority date of this application. The disclosures of all patents, patent applications and publications cited herein are hereby incorporated herein by reference, to the extent that they provide materials and procedural details supplementary to those set forth herein.

What is claimed is:

1. A sulfur recovery system comprising:
   a first reaction zone comprising a short contact time reactor containing a catalyst having activity for catalyzing the partial oxidation of $H_2S$ to elemental sulfur and water in the presence of $O_2$;
   a second reaction zone adapted for receiving reacted gases from said first reaction zone and containing a catalyst having activity for catalyzing the partial reduction of $SO_2$ to elemental sulfur in the presence of a reductant gas;
   an inlet for said reductant gas disposed between said first and second reaction zones; and
   a cooling zone comprising a first sulfur condenser having a liquid sulfur outlet and a desulfurized gas outlet.

2. The system of claim 1 comprising a mixing zone disposed between said first and second reaction zones.

3. The system of claim 1 wherein said first and second reaction zones are contained in a single reactor.

4. The system of claim 1 wherein said first reaction zone is contained in a reactor that is separate from said second reaction zone.

5. The system of claim 4 wherein said cooling zone is disposed between said first reaction zone and said second reaction zone.

6. The system of claim 4 further comprising a second sulfur condenser following said second reaction zone.

7. The system of claim 1 comprising at least one tail gas treatment unit.

8. The system of claim 1 wherein said first reaction zone is housed in a reactor capable of withstanding temperatures of at least about 1,450° C.

9. A process for recovering sulfur from a $H_2S$-containing gas stream comprising:
   contacting a first feed gas stream comprising a mixture of $H_2S$ and $O_2$ with a first catalyst in a first reaction zone, wherein the contact time of said first feed gas stream with said first catalyst is no more than 200 milliseconds, said first catalyst having activity for catalyzing the partial oxidation of $H_2S$ to elemental sulfur and water, whereby a first stage product gas mixture is formed;
   maintaining the temperature of said first reaction zone above 300° C.;
   contacting a second feed gas stream comprising a mixture of said first stage product gas mixture and a reductant gas with a second catalyst in a second reaction zone, said second catalyst having activity for catalyzing the partial reduction of $SO_2$ to elemental sulfur, whereby a second stage product gas mixture is formed comprising elemental sulfur, $H_2O$ and $CO_2$;
   maintaining the temperature of said second reaction zone above the dew point of sulfur; and
   cooling said first and/or second stage product gas mixture sufficiently to condense liquid sulfur.

10. The process of claim 9 employing the system according to claim 3.

11. The process of claim 9 employing the system according to claim 4.

12. The process of claim 9 employing the system according to claim 5.

13. The process of claim 9 wherein said cooling comprises
   cooling said second stage product gas mixture to a temperature above the dewpoint of sulfur, to provide a partially cooled product stream; and
   passing said partially cooled product stream into a sulfur condenser and further cooling said partially cooled product stream to the dewpoint temperature of gaseous elemental sulfur, or lower, but above the melting point of solid sulfur, such that the liquid phase of said sulfur product is formed; and
   withdrawing liquid sulfur from said sulfur condenser.

14. The process of claim 9 comprising partially desulfurizing said first stage product gas mixture prior to mixing with said reductant gas to provide said second feed gas stream.

15. The process of claim 14 wherein said partially desulfurizing said first stage product gas mixture comprises:
   cooling said first stage product gas mixture to a temperature above the dewpoint of sulfur, to provide a partially cooled first stage product stream; and
   passing said partially cooled first stage product gas mixture into a sulfur condenser and further cooling said partially cooled first stage product gas mixture to the dewpoint temperature of gaseous elemental sulfur, or lower, but above the melting point of solid sulfur, such that the liquid phase of said sulfur product is fanned; and withdrawing liquid sulfur from said sulfur condenser.

16. The process of claim 15 comprising condensing elemental sulfur from said second stage product gas mixture.

17. The process of claim 9 comprising maintaining a $O_2$:$H_2S$ molar ratio of at least 0.51:1 in said first feed gas stream.

18. The process of claim 9 comprising maintaining a reductant gas C:$SO_2$ molar ratio of at least 1:0.3.

19. The process of claim 9 comprising regulating the concentration of $O_2$ in said first feed gas mixture such that
essentially 100% of the $H_2S$ component of said feed gas stream is converted,
said first stage product gas mixture contains no more than about 50% sulfur in the form of $SO_2$ (relative to the sulfur content in the feed gas stream), and
said first stage product gas mixture contains at least 50% elemental sulfur (relative to the sulfur content in the feed gas stream).

20. The process of claim 9, wherein said cooling sten comprises cooling said second stare product gas mixture sufficiently to condense liquid sulfur and to provide an at least partially desulfurized second stage product gas stream, said process further comprising regulating the concentration of reductant gas in said second feed gas mixture such that the $SO_2$ content of said at least partially desulfurized second stage product gas is less than 5% (sulfur in the form of $SO_2$ relative to the amount of sulfur in the $H_2S$ feed).

21. The process of claim 9 comprising maintaining the temperature of said first reaction zone in the range of 700–1,500° C.

22. The process of claim 9 comprising preheating said first stage feed gas mixture to about 200° C. before contacting said first catalyst.

23. The process of claim 9 comprising:
regulating the temperature of said first feed gas stream, regulating the $O_2$ concentration in said first feed gas stream, and/or applying heat to said first catalyst such that the temperature of said first reaction zone is in the range of 850–1,450° C.

24. The process of claim 9 wherein said first catalyst comprises a refractory support chosen from the group consisting of one or more oxides of Al, Zr, Mg, Ce, Si, La, Sm and Yb.

25. The process of claim 9 wherein said first catalyst comprises at least one metal chosen from the group consisting of Pt, Rh, Ru, Ir, Ni, Pd, Fe, Co, Re, Rb, V, Bi and Sb.

26. The process of claim 25 wherein said first catalyst further comprises at least one lanthanide element chosen from the group consisting of La, Ce, Pr, Nd, Pm, Sm, Eu, Gd, Tb, Dy, Ho, Er, Tm, Yb and Lu.

27. The process of claim 25 wherein said first catalyst further comprises at least one alkaline element chosen from the group consisting of Mg, Ca and Ba.

28. The process of claim 9 wherein said second catalyst comprises:
at least one metal oxide comprising an alkaline earth metal or a lanthanide metal,
optionally, at least one precious metal promoter, and
optionally, at least one transition metal.

29. The process of claim 28 wherein said at least one metal oxide comprises at least one metal chosen from the group consisting of Be, Mg, Ca, Sr, Ba, La, Ce, Pr, Nd, Pm, Sm, Eu, Gd, Tb, Dy, Ho, Er, Tm, Yb and Lu.

30. The process of claim 29 wherein said at least one precious metal promoter is chosen from the group consisting of Ag, Au, Pd, Pt, Rh, Ru, Os and Ir.

31. The process of claim 30 wherein said at least one transition metal is chosen from the group consisting of Ni, Co, Fe, Sn, Cu and Mn.

32. The process of claim 28 wherein said second catalyst comprises
1–20 wt % single or mixed metal oxide wherein said metal is/metals are chosen from the group consisting of alkaline earth metals and lanthanide metals,
and, optionally, 0.05–10 wt % precious metal promoter.

33. The process of claim 9 comprising maintaining the temperature of said second reaction zone above the dewpoint of sulfur.

34. The process of claim 33 comprising maintaining the temperature of said second reaction zone in the range of about 350–1,200° C.

35. The process of claim 9 comprising maintaining superatmospheric pressure in said first and/or second reaction zone.

36. The process of claim 9 comprising supplying said oxygen to said first stage catalyst in increments.

37. The process of claim 9, wherein said step of contacting said first feed gas stream with said first catalyst comprises passing said first feed gas stream over said first catalyst at a gas hourly space velocity of at least 20,000 $h^{-1}$.

38. The process of claim 9, comprising, prior to said step of contacting said first feed gas stream with said first catalyst, mixing together a $H_2S$-containing stream comprising 1–100% $H_2S$, and an $O_2$-containing stream, to form said first feed gas stream.

* * * * *